United States Patent
Nadeau

(10) Patent No.: US 6,523,700 B2
(45) Date of Patent: Feb. 25, 2003

(54) DISPLAY AND STORAGE RECEPTACLE FOR COMPACT DISC CASES

(76) Inventor: Michel Nadeau, 252, Du Havre, St-Eustache, Quebec (CA), J7P 4B3

( * ) Notice: Subject to any disclaimer, the term of this patent is extended or adjusted under 35 U.S.C. 154(b) by 0 days.

(21) Appl. No.: 10/107,037

(22) Filed: Mar. 28, 2002

(65) Prior Publication Data
US 2002/0139761 A1 Oct. 3, 2002

(30) Foreign Application Priority Data
Mar. 29, 2001 (CA) .............................................. 2343708

(51) Int. Cl.$^7$ .............................................. A47G 29/00
(52) U.S. Cl. ...................................................... 211/40
(58) Field of Search ...................... 211/40, 41.1, 41.12; 206/309; 312/9.1

(56) References Cited

U.S. PATENT DOCUMENTS

| 966,333 | A | * | 8/1910 | Hemming | .................... 211/51 |
| 1,141,274 | A | | 6/1915 | Skall | |
| 1,421,391 | A | | 7/1922 | Bower | |
| 2,804,212 | A | | 8/1957 | Spitzig | |
| 3,017,999 | A | * | 1/1962 | Cano | ......................... 211/169 |
| 3,255,890 | A | | 6/1966 | Gerber | |
| 3,391,796 | A | | 7/1968 | Cross | |
| 3,760,952 | A | | 9/1973 | White | |
| 3,957,159 | A | | 5/1976 | Radek | |
| 4,765,469 | A | | 8/1988 | Seifert | |
| 4,817,792 | A | | 4/1989 | Seifert | |
| 5,160,050 | A | * | 11/1992 | Russo | ......................... 211/169 |
| 5,176,264 | A | | 1/1993 | De Palma | |
| 5,253,767 | A | * | 10/1993 | Koeppel | ..................... 211/144 |
| 5,259,515 | A | | 11/1993 | Koeppel | |
| 5,415,296 | A | * | 5/1995 | Wright | ......................... 211/40 |
| 5,551,577 | A | * | 9/1996 | Hagopian | ..................... 211/4 |
| 5,588,537 | A | | 12/1996 | Hagopian | |
| 6,000,561 | A | | 12/1999 | Schumacher | |

* cited by examiner

Primary Examiner—Alvin Chin-Shue
Assistant Examiner—Sarah Purol

(57) ABSTRACT

A receptacle for a compact disc case comprising a back wall and a front wall that are spaced apart to receive a compact disc case therebetween. The walls being configured so as to define a multiple direction entry path for the insertion of a compact disc case, such that the compact disc case is inserted within the receptacle by moving through a first movement and a second movement. The first movement being a movement wherein the compact disc case is displaced toward the back wall of the receptacle along a direction perpendicular to the main faces of the compact disc case. The second movement being a movement wherein the compact disc case is displaced, either manually by the user or automatically by the sole effect its own weigh in the case of an inclined receptacle, between the front wall and the back wall along a direction generally parallel to the imaginary plane such as to position the compact disc case between the front wall of the receptacle and the back wall of the receptacle.

20 Claims, 18 Drawing Sheets

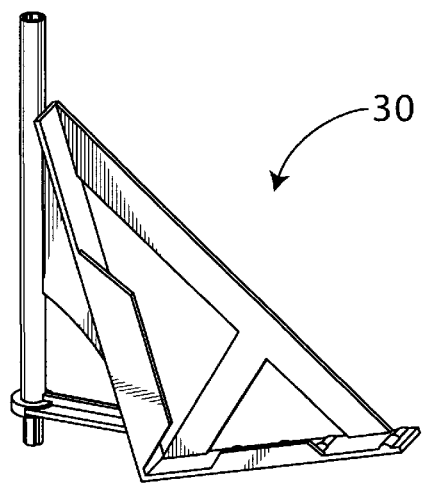
FIG. 3
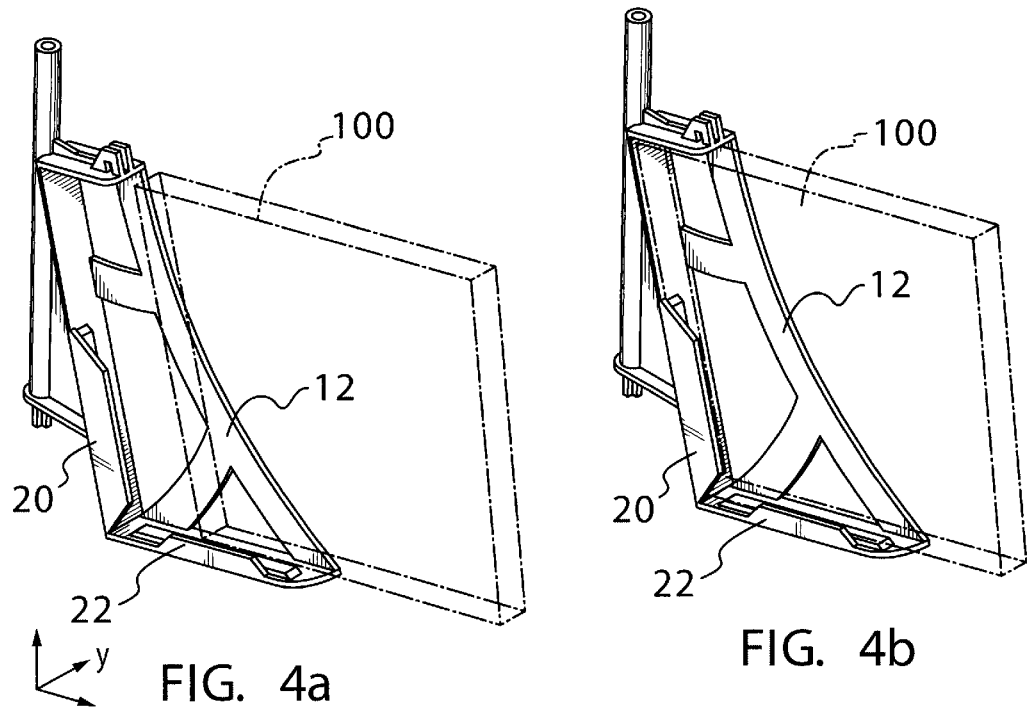
FIG. 4a
FIG. 4b

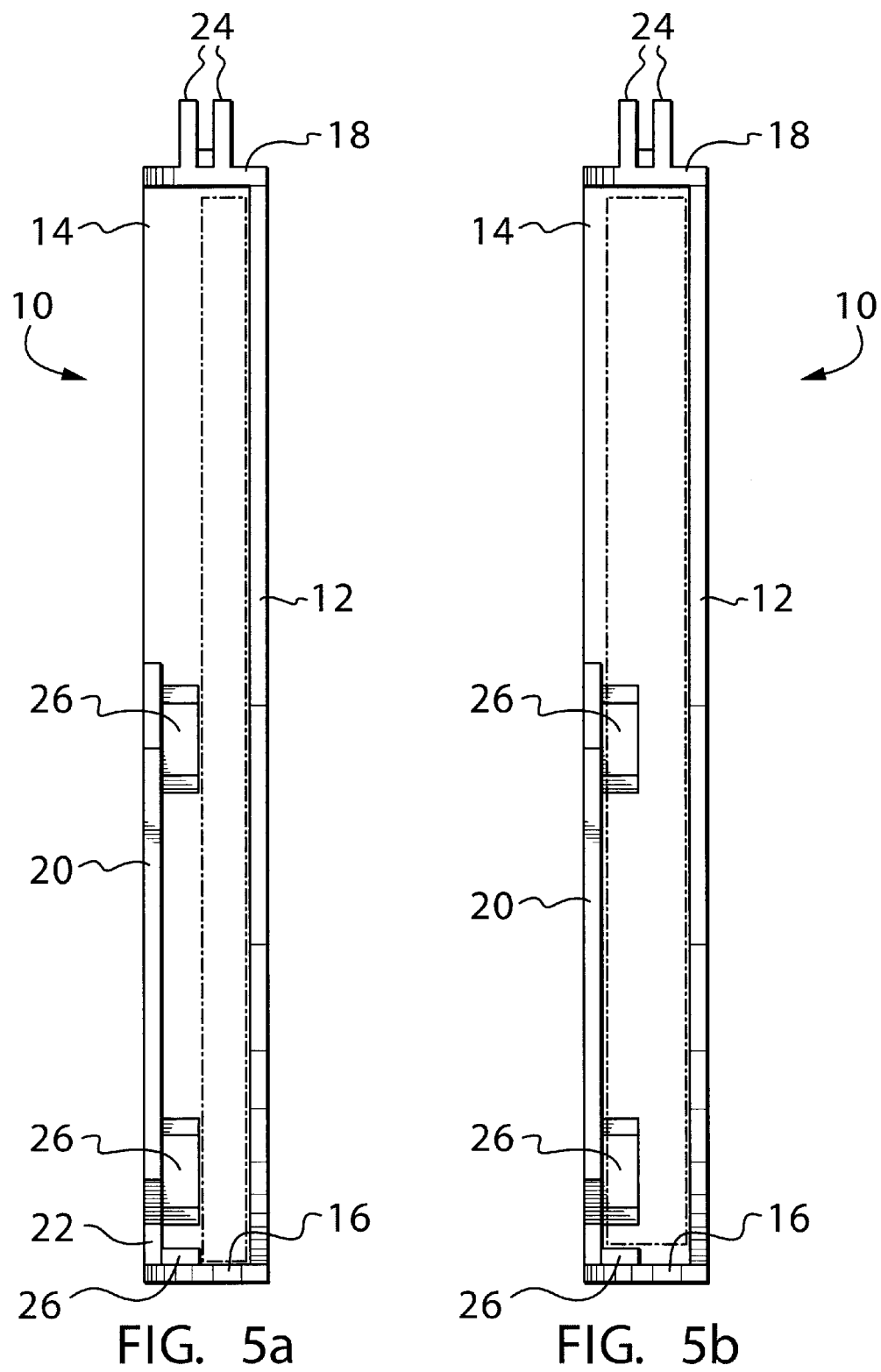

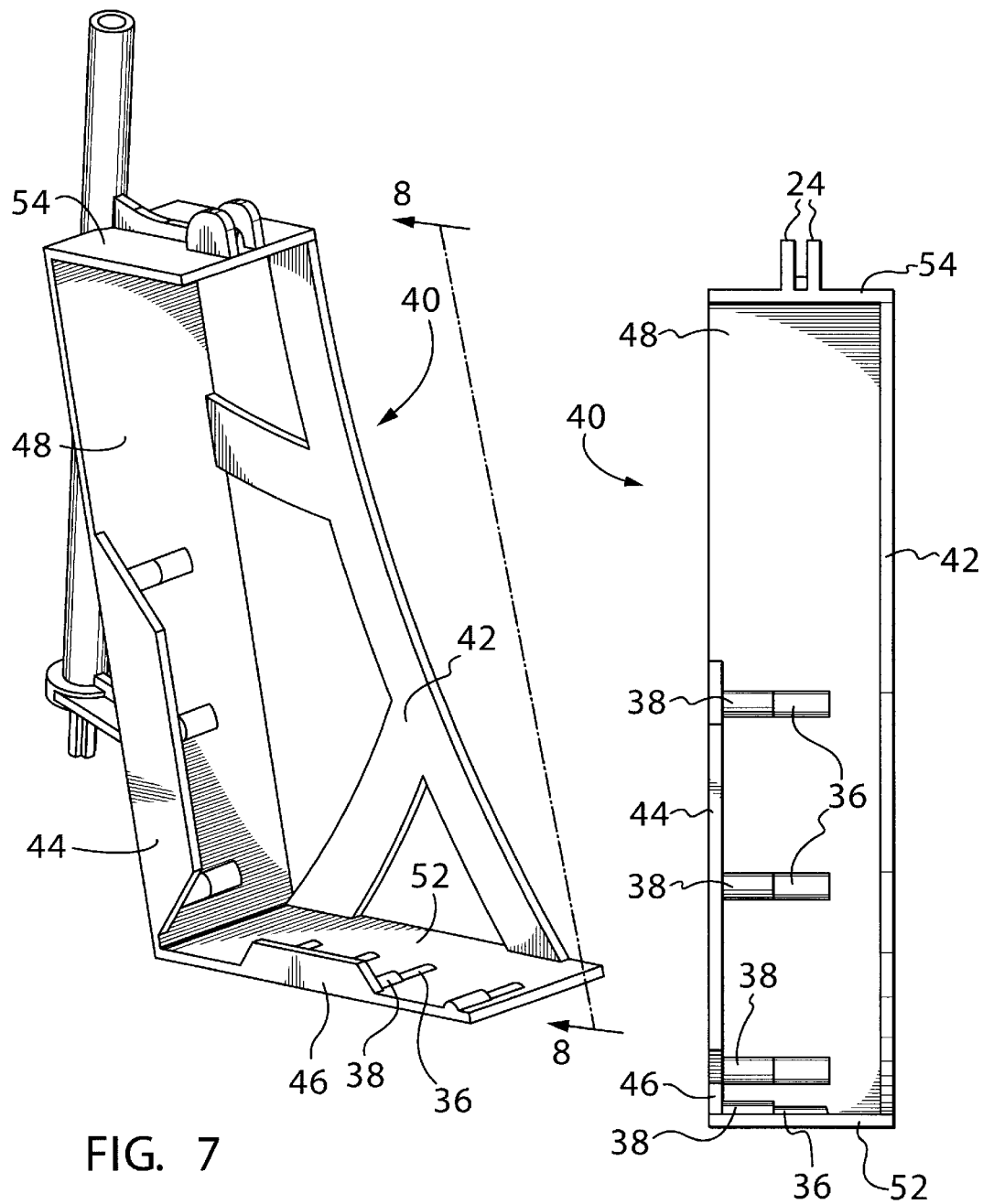

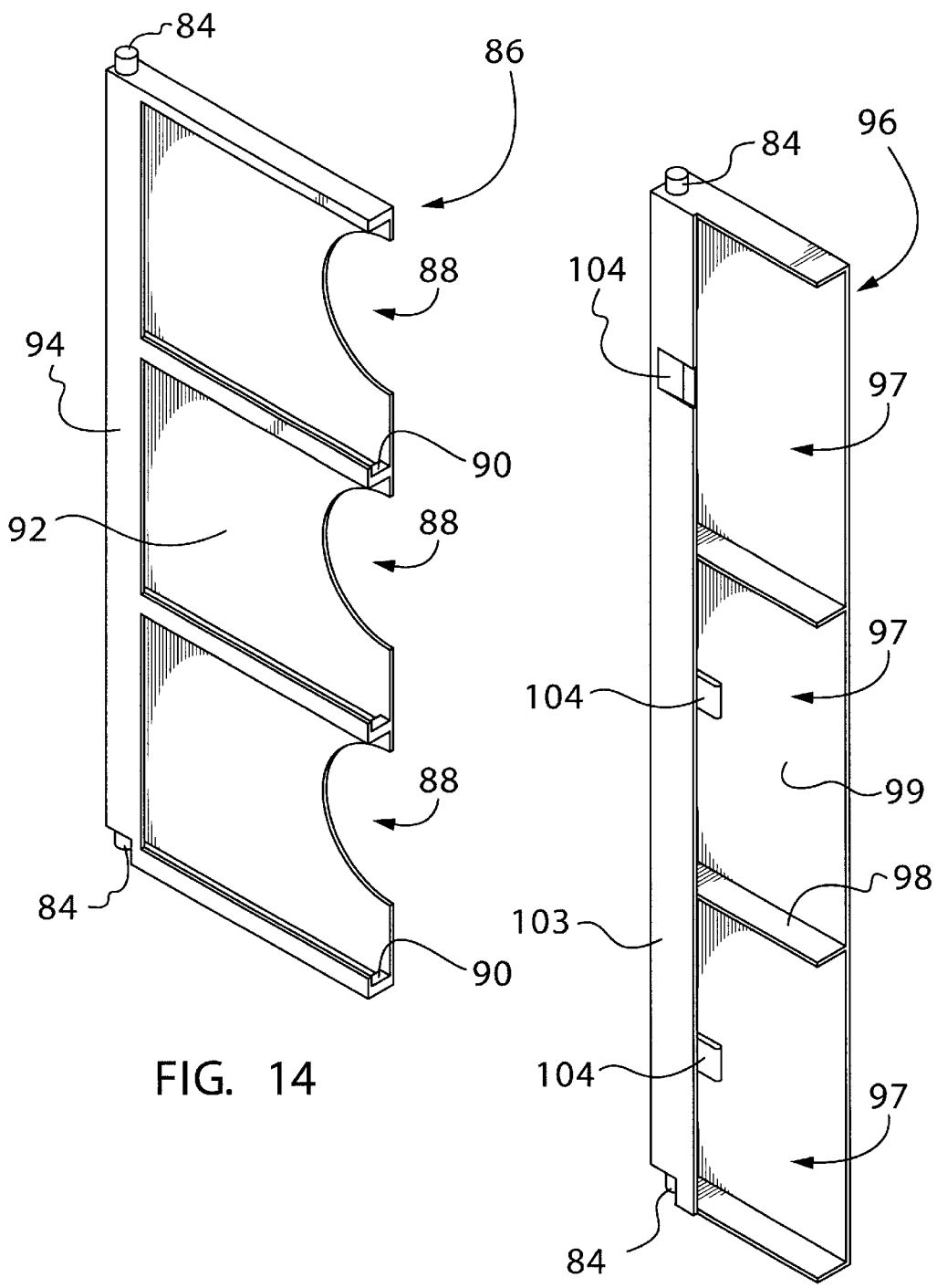

DISPLAY AND STORAGE RECEPTACLE FOR COMPACT DISC CASES

FIELD OF THE INVENTION

The present invention relates to the field of receptacles for storing and displaying compact disc cases, and the like. More specifically, the present invention relates to receptacles for storing CD cases, wherein the receptacles define a multi-direction entry path for the insertion of the compact disc case, and are capable of being pivotally mounted within a display rack.

BACKGROUND OF THE INVENTION

Compact discs are becoming an increasingly common medium for storing information. Everything from music, to movies to software is being stored in various formats on compact discs. As a result, people are accumulating more and more compact discs contained in "jewel" cases both at home and at work. For example, many individuals have home collections of audio CDs, CD-ROMs, game software, as well as home collections of movies on DVD. Similarly, in the work place, many employees, especially those who work in the information technology field, have numerous CDs that contain the software they need to perform their jobs. Furthermore, the growing availability of equipment that enables individuals to write, or burn, information onto compact discs is making the use of compact discs even more common in everyday life.

With the increase in the number of CDs found in people's homes and offices, there is an increase in the demand for display and storage racks that can store and display the many CD cases.

One such display rack is described in U.S. Pat. No. 1,421,391 issued to Bower. The display and storage rack described in this document comprises vertical disc storing receptacles that are positioned along a vertical axis to form frames of receptacles that are pivotable about a vertical rod on a display rack. A disadvantage associated with the display rack described by Bower is that in order to place the discs within the receptacles, the discs are required to be inserted from the narrow side of the receptacle, thereby requiring careful alignment and significant concentration by the user. The fact that the rack is pivotable renders the task of inserting discs within the receptacles that much more difficult.

Another type of display rack is disclosed in U.S. Pat. No. 5,176,264 issued to De Palma. This document describes a display case for compact discs, and the like, that includes a rotatable display case having numerous slots for inserting the compact discs. Once again, this display rack requires that the CDs be inserted along their thin sides and therefore must be carefully aligned in order to be inserted properly within the display case. Furthermore, this display case has the disadvantage that once the CDs are stored within the rack, they can only be identified by reading the writing positioned on the thin side of the CD case. As such, once the CDs have been inserted within the display rack, the task of locating a specific CD is often time consuming and frustrating for the user.

Therefore, there is a need in the industry for a display and storage receptacle that enables a user to easily and efficiently insert a compact disc case within the receptacle and that enables a user to easily identify a CD once it has been placed within the receptacle.

SUMMARY OF THE INVENTION

As embodied and broadly described herein, the present invention provides a receptacle for a compact disc case, or the like. The compact disc case lies in an imaginary plane and has a pair of main opposed faces that are generally parallel to the imaginary plane. The CD cases also include a peripheral sidewall that has a thickness and extends between the pair of main opposed faces. The receptacle of the invention comprises a back wall and a front wall, wherein the front wall is spaced from the back wall by a distance not less than the thickness of the peripheral sidewall of the compact disc case. The front wall and the back wall define therebetween a space for receiving the compact disc case. In addition, the front wall and the back wall define a multiple direction entry path for the insertion of the compact disc case. The compact disc is movable through the multiple direction entry path by performing a first movement and a second movement. The first movement of the compact disc is a movement during which the compact disc case is displaced toward the back wall along a direction generally perpendicular to the imaginary plane of the compact disc. The front wall and the back wall of the receptacle being characterized by a geometrical relationship such that during the first movement the compact disc case can be moved past the front wall and brought into abutment against the back wall. The second movement is a movement during which the compact disc case is displaced between the front wall and the back wall along a direction generally parallel to the imaginary plane such as to bring the compact disc case in a position wherein the front wall overlaps with a portion of one of the main faces of the compact disc case, and the back wall overlaps with at least a portion of the other main face of the compact disc case. The overlapping being sufficient to retain the CD case within its inserted position.

As embodied and broadly described herein, the present invention provides a receptacle for a compact disc case, wherein the compact disc case has a pair of main opposed faces and a peripheral sidewall that extends between the main faces. The peripheral sidewall also has a thickness. The receptacle comprises a back wall, a front wall that is spaced from the back wall by a distance that is not less than the thickness of the peripheral sidewall of the compact disc case. The front wall and the back wall define therebetween a space for receiving the compact disc case, and define a multiple direction entry path for the insertion of the compact disc case in the space. The compact disc case is movable through the entry path by performing a first movement and a second movement. The first movement is a movement during which the compact disc case is displaced toward the back wall along a direction generally perpendicular to the back wall of the receptacle. The front wall and back wall are characterized by a geometrical relationship such that during the first movement the compact disc case is moved past the front wall and brought in abutment against the back wall. The second movement is a movement during which the compact disc case is displaced between the front wall and the back wall along a direction generally parallel to the back wall of said receptacle such as to bring the compact disc case into a position wherein the front wall overlaps a portion of one of the main faces of the compact disc case and the back wall overlaps with at least a portion of the other main face of the compact disc case.

As embodied and broadly described herein, the present invention further provides a receptacle that comprises a peripheral wall extending between the front wall and the back wall. The peripheral wall includes a base wall portion and a side wall portion.

In a specific embodiment of the invention, the base wall portion and the side wall portion are characterized by a geometrical relationship wherein the base wall portion and the side wall portion are connected at a substantially 90 degree angle.

In a specific embodiment of the invention, the front wall comprises a first section and a second section. The first section extends along the base wall portion, and the second section extends along the side wall portion.

In a specific embodiment of the invention, the receptacle is upwardly inclined so that the CD case is able to slide independently towards the side wall portion into an inserted position.

In a specific embodiment of the invention, the base wall portion includes an inner surface, an outer surface, a longitudinal axis, a width, and at least one protrusion extending from the inner surface. The protrusion has a width that is less than that of the base wall portion and extends along the longitudinal axis.

In a specific embodiment of the invention, the side wall portion includes an inner surface, an outer surface, a longitudinal axis, a width, and at least one protrusion extending from the inner surface. The protrusion has a width that is less than that of the side wall portion and extends along the longitudinal axis.

In a specific embodiment, the receptacle includes an upper end pivot and a lower end pivot forming a pivot axis adjacent to the side wall portion.

In a specific embodiment, one of the upper end pivot and the lower end pivot includes a cavity with an inner diameter, and the other of the upper end pivot and the lower end pivot includes a protrusion with a transverse measurement that is less than the inner diameter of the cavity.

In a further specific embodiment, the base wall portion includes an inner end portion that is adjacent to the side wall portion, an intermediate portion for receiving the compact disc case, and an outer end portion that has a projection for preventing the compact disc case from sliding out of the intermediate portion.

In a further specific embodiment, the front wall includes a projection that extends into the space defined between the front wall and the back wall.

In a further specific embodiment, the back wall includes a projection that extends into the space defined between the front wall and the back wall.

As further embodied and broadly described herein, the present invention provides a panel comprising more than one receptacle for receiving compact disc cases.

In a specific embodiment the more than one receptacle are aligned such that the back walls of the receptacles are coplanar.

BRIEF DESCRIPTION OF THE DRAWINGS

A detailed description of examples of implementation of the present invention is provided hereinbelow with reference to the following drawings, in which:

FIG. 3 is a front perspective view of an individual receptacle for storing a compact disc case in accordance with a second specific embodiment of the invention;

FIG. 4A is a front perspective view of the CD receptacle of FIG. 1, showing a compact disc case in a first insertion position;

FIG. 4B is a front perspective view of the receptacle of FIG. 1, showing a compact disc case in a stored position;

FIG. 5A is view of the receptacle of FIG. 1 taken along line 5a—5a shown in FIG. 1, and having a thin compact disc case inserted therein;

FIG. 5B is view of the receptacle of FIG. 1 taken along line 5a—5a shown in FIG. 1, having a thick compact disc case inserted therein;

FIG. 7 is a front perspective view of an individual receptacle for storing a compact disc case in accordance with a fourth specific embodiment of the invention;

FIG. 8 is a side elevation of the receptacle of FIG. 7 taken along lines 8—8 as shown in FIG. 7;

FIG. 14 is a front perspective view of a panel in accordance with a fourth specific embodiment of a panel;

FIG. 15 is a front perspective view of a panel in accordance with a fifth specific embodiment of a panel;

Figure 1:
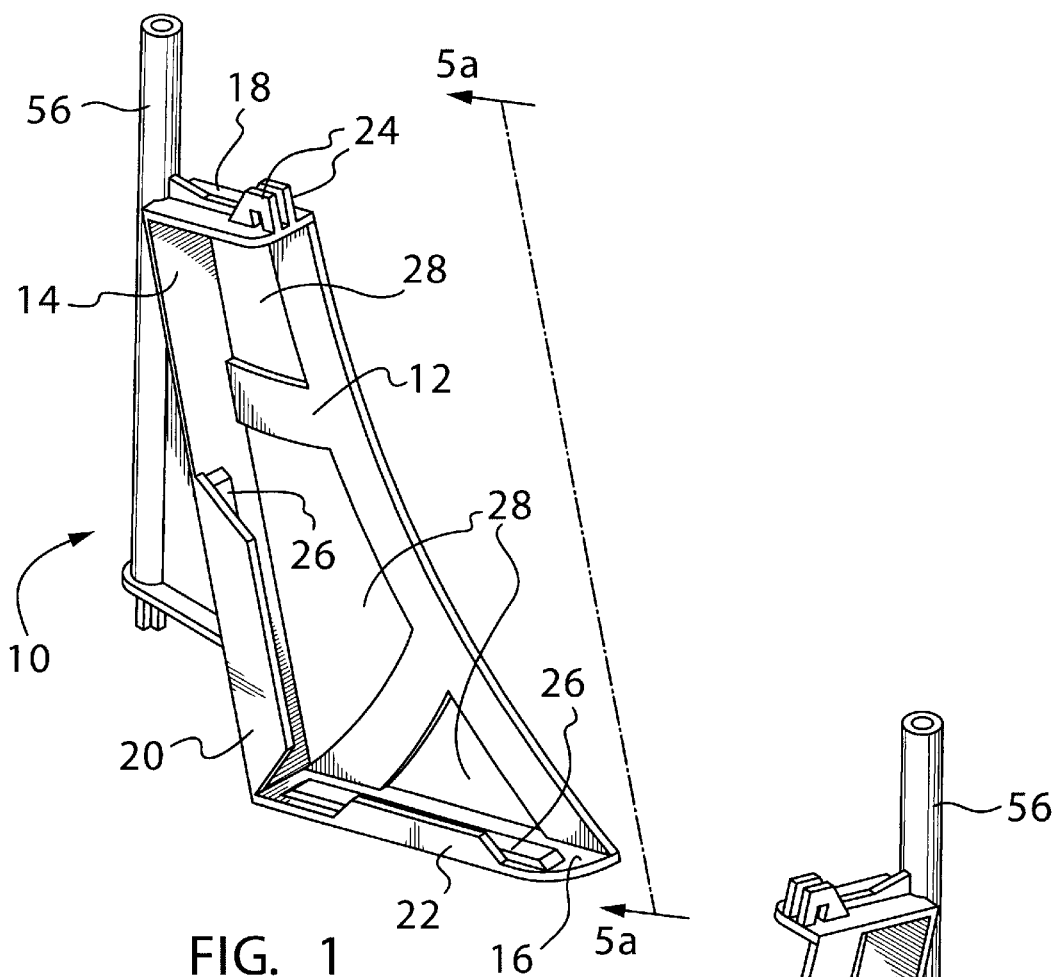
FIG. 1 is a front perspective view of an individual receptacle for storing a compact disc case in accordance with a first specific embodiment of the invention.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION

The detailed description below refers to receptacles for storing compact disc cases and the like, as well as to the use of the receptacles within panels and various types of display racks. It is to be understood that compact disc cases that are to be stored within the receptacles of the present invention lie in an imaginary plane and have a pair of main opposed faces and a peripheral sidewall of a certain thickness that extends between the two main opposed faces. The imaginary plane is generally parallel to the opposed main faces. The skilled person in the art will appreciate that the term "compact disc case", refers to any type of "jewel" case used for storing audio discs, DVDs, Cdroms, writable CDs and any other form of compact disc that can fit within a "jewel" case having the properties described above. It should also be understood that for the purposes of this specification, the term "compact disc" and the abbreviation "CD" are used interchangeably and have the same meaning.

Figure 2:
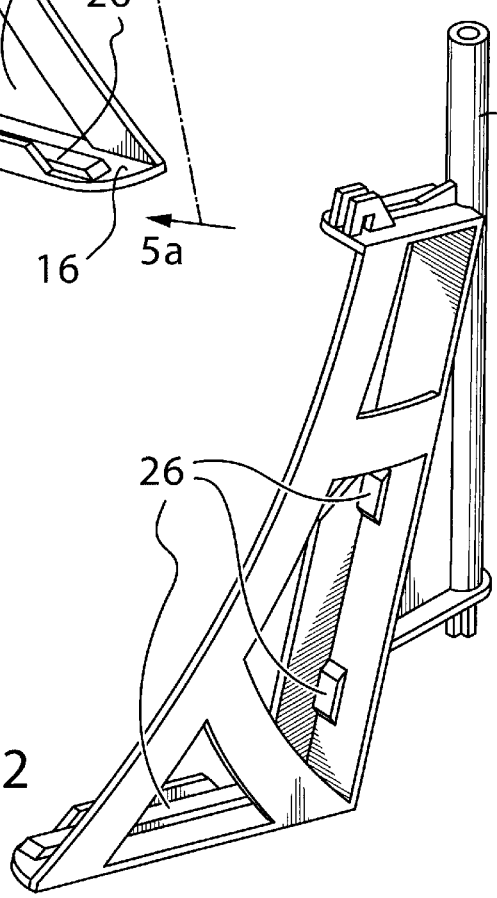
FIG. 2 is a rear perspective view of the receptacle of FIG. 1.

FIGS. 1 and 2 show an individual receptacle 10 in accordance with a first specific embodiment of the invention. As can be seen, receptacle 10 includes a back wall 12, a top wall 18, two front walls 20 and 22 and a peripheral wall that has a side wall portion 14 and a base wall portion 16 that extends between the front walls 20 and 22 and the back wall 12. A space having a thickness that is not less than the thickness of a given CD case is defined between front walls 20 and 22 and back wall 12. In the specific embodiment shown in FIG. 1, back wall 12 extends from base wall portion 16 up to top wall 18, and is formed of strips that define apertures 28 therebetween. Back wall 12 is shaped so as to support a CD case and to provide receptacle 10 with an aesthetically pleasing appearance. It should be understood that in alternative embodiments back wall 12 does not extend as high as top wall 18 and does not include any apertures.

Base wall portion 16 is adapted to support a portion of the peripheral sidewall of a CD case, once the CD case has been inserted within receptacle 10. In the specific embodiment shown in FIGS. 1 and 2, base wall portion 16 is shorter than the length of a standard CD case and is positioned at a slight upward angle in relation to a horizontal axis. In a non-limiting example of implementation, this slight angle, which can range between 0 and 90 degrees with respect to a horizontal axis, enables a CD case being inserted within receptacle 10 to slide independently, without a user's help, into a stored position. In addition, the slight inclination prevents a stored CD case from falling out of receptacle 10. In an alternative embodiment, the angle of inclination of the base wall is small enough that a CD case is unable to slide independently and requires the user's help to move into the stored position. It should be understood that a base wall portion 16 may be of any length that surpasses the center of gravity of a CD case when the CD case is in a fully inserted position.

In the specific embodiment shown in FIGS. 1 and 2, top wall 18 is of a shorter length than base wall portion 16. Included on the top surface of top wall 18 is an upper end connector 24 that is adapted to receive a corresponding lower end connector (not shown in FIGS. 1 and 2) on another receptacle when two receptacles are attached together. This will be described in more detail further on in the specification. It should be understood that a receptacle without a top wall is also within the scope of the invention. This can be seen in FIG. 3, which shows a receptacle 30 in accordance with a second specific embodiment of the invention.

Referring back to the specific embodiment shown in FIGS. 1 and 2, it can be seen that side wall portion 14 extends from base wall portion 16 up to top wall 18, and is adapted to support a portion of the peripheral sidewall of a CD case once the CD case has been inserted within receptacle 10. Side wall portion 14 is positioned at a substantially right angle with respect to base wall portion 16 and therefore is positioned at a slight angle with respect to a vertical axis. It should, however, be expressly understood, that a side wall portion and a base wall portion that are not positioned at a substantially right angle with respect to each other are within the scope of the present invention. In an alternative embodiment, side wall portion 14 does not extend up from base wall portion 16 to top wall 18, and instead extends upwards from base wall portion 16 to a height that is sufficient to prevent an inserted CD case from falling out of receptacle 10. In an alternative embodiment (not shown in the Figures) side wall portion is made of one or many shorter partial side walls, that form a discontinued side wall (not illustrated). For example, side wall portion 14 may simply be a pin, or bar that acts as a stopper. It should be understood that side wall portion 14, may be of any shape, size and configuration so long as it acts to prevent an inserted CD case from falling out of receptacle 10.

Receptacle 10 includes two separate front walls 20 and 22. Front wall 20 is thin and tall and is positioned along the frontal edge of side wall portion 14. Front wall 22 is long and short and is positioned along the frontal edge of base wall portion 16. Front walls 20 and 22 are shaped and positioned so as to achieve two functions, firstly, to retain a CD case stored within receptacle 10 in place, and secondly to enable a CD case to be inserted within receptacle 10 by moving through a multiple direction entry path. In a preferred embodiment, the back wall 12 is higher than front wall 22 so that the back wall 12 can be used as an efficient CD insertion guide. This will be described in more detail further on with reference to FIGS. 4A and 4B.

There are many possible variations in the height, shape and positioning of walls 12, 14, 16, 18, 20 and 22 that define receptacle 10. Therefore, it should be expressly understood that the walls of receptacle 10, particularly front walls 20 and 22 and back wall 12, can be of any aesthetic design or shape, and can be characterized by any geometrical relationship so long as they enable the retention of a CD within receptacle 10, and enable a CD to be inserted within receptacle 10 by moving through a multiple direction entry path. For, example, in an alternative embodiment, the back wall of the receptacle may be of exactly the same shape and size as the front wall (or walls) of the receptacle, but may extend from the peripheral wall such that it is staggered from the front wall. The staggering of the front and back walls defines the multiple-direction entry path that will be described in more detail below.

As mentioned above, the front walls 20 and 22 and the back wall 12 are characterized by a geometrical relationship that defines a multiple direction entry path for the insertion of a compact disc case, such that the compact disc case is moveable through the entry path by performing a first movement and a second movement. In the first movement, the compact disc case is displaced towards the back wall 12 of the receptacle along a direction that is generally perpendicular to the imaginary plane of the compact disc case. For the purposes of this specification, generally perpendicular refers to a movement in any direction with respect to a three dimensional coordinate system, that includes at least one component that is in a direction perpendicular to the imaginary plane of the compact disc case. As such, a movement that includes a component that is not in a direction that is perpendicular to the movement of the compact disc case is still included within the scope of the invention. Alternatively, it can be said that during the first movement, the CD case moves in a direction that is generally perpendicular to the plane of the back wall of the receptacle. As such, the term "generally perpendicular to the back wall" refers to a movement by the CD case in any direction with respect to a three dimensional coordinate system, that includes at least one component that is in a direction perpendicular to the plane of the back wall of the receptacle.

It will be appreciated that as the CD case 100 is moved through the first movement it is able to be moved past the front walls 20 and 22 such that at least a portion of the CD case is able to abut against back wall 12, such that it can be positioned within receptacle 10 as shown in FIG. 4A.

Once CD case 100 has moved through the first movement such that it has abutted back wall 12, and placed such that the main faces of the CD case are parallel to back wall 12, then the CD case 100 is moved through a second movement, which will put the compact disc case 100 in the stored position as shown in FIG. 4B. During the second movement, the compact disc case is displaced between the front walls 20 and 22 and back wall 12, along a direction that is generally parallel to the imaginary plane of the compact disc case. Once the compact disc case has moved through the second movement, such that it has assumed the position shown in FIG. 4B, the front walls 20 and 22 overlap a first portion of one of the main faces of the compact disc case, and the back wall 12 overlaps with a portion of the other main face of the compact disc case, so that the front wall 20 and 22 and back wall 12 can retain the CD case in its proper inserted position.

It should be noted that in the specific example shown in FIGS. 4A and 4B, the angle of inclination of the base wall of the receptacle is such that in order for CD case 100 to perform the second movement, it simply needs to drop between front wall 22 and back wall 12, and slide between front wall 20 and back wall 12. Due to the slight angle of inclination of receptacle 10, this second movement can be performed without the user's help. In an alternative embodiment, the angle of inclination of the CD case is insufficient to allow a CD case to independently slide into the stored position and therefore the user's help is required to push the CD into the stored position. It should be understood that in the non-limiting example of implementation wherein the compact disc case is able be dropped such that it slides independently into the stored position, the base wall of the receptacle extends past the center of gravity of the CD case at the position wherein the CD case is dropped, such that the CD case is able to land on the base wall without falling off.

It should be noted that no alignment of the thin peripheral sidewalls of CD case 100 needed to be performed in order to insert CD case 100 into receptacle 10.

Once the CD case 100 has been inserted within receptacle 10, the front walls 20 and 22 do not cover or obstruct the majority of the front face (or the rear face depending on how the CD case is inserted), and as such, receptacle 10 advantageously enables a user to identify a CD contained within receptacle 10 quickly and easily without having to read the writing located on the thin peripheral sidewalls of the CD case. It should also be noticed that in the preferred embodiment, back wall 12 includes apertures 28, which enable the user to clearly view of the rear face of the CD case.

In a preferred embodiment, receptacle 10 is designed to accommodate CD cases of all different widths. As can be seen in both FIGS. 1 and 2, side wall portion 14 and base wall portion 16 include positioning rails 26. These positioning rails 26 extend upwardly from base wall portion 16 and inwardly from side wall portion 14, such that they protrude into the space defined for receiving a compact disc case. The positioning rails 26 run along at least a portion of the longitudinal axis of the base wall portion 16 and the side wall portion 14, and have a thickness that is less than the thickness of the side wall portion 14 and the base wall portion 16. In a preferred non-limiting example of implementation, positioning rail 26 of base wall portion 16 extends to the outer end portion of base wall 16. These positioning rails 26 enable CD cases of varying thicknesses to fit snugly within receptacle 10. In addition, should a user want to insert two thin CD cases, for example, in the same receptacle, then the positioning rails 26 will retain a first thin CD case in an upright position against the back wall so that it will not obstruct the easy insertion of a second thin CD case within the same receptacle using the same previously described first and second movement approach.

FIG. 5A is a side elevation view of receptacle 10 as taken along lines 5a—5a shown in FIG. 1. As can be seen, a thin CD 101 is positioned within receptacle 10 such that it fits snugly between positioning rails 26 and back wall 12. Due to the thinness of CD 101, if there were no positioning rails 26 located within receptacle 10, CD 101 would be loosely contained within receptacle 10 and would be more likely to fall out. In addition, a loosely fit CD will make more noise when receptacle 10 is moved about.

FIG. 5B shows a wider CD 102 positioned within the same receptacle 10 as shown in FIG. 5A. The base of wider CD 102 rests on top of positioning rail 26 located on the base wall 16 of receptacle 10 and leans against positioning rail 26 located on the side wall portion 14. Wider CD 102 fits snugly between the two front walls 20 and 22, and back wall 12.

Figure 6:
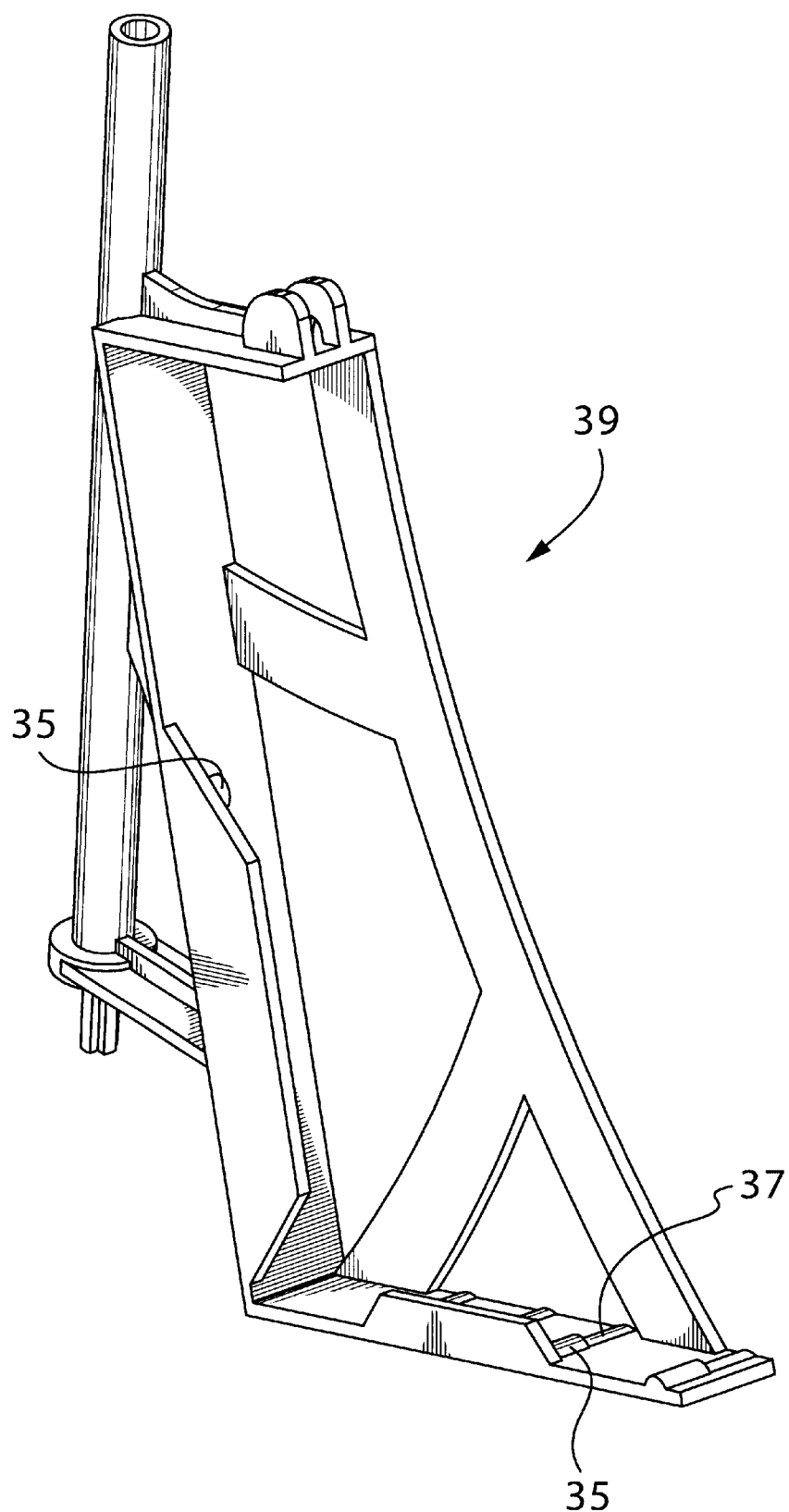
FIG. 6 is a front perspective view of an individual receptacle for storing a compact disc case in accordance with a third specific embodiment of the invention.

Shown in FIG. 6 is a receptacle 39 according to a third embodiment of the invention. Receptacle 39 includes a series of positioning rails 35 located along the longitudinal axis of the base wall. In a preferred, non-limiting embodiment, a positioning rail 35 is positioned at the extremity of the outer end portion of the base wall, thereby ensuring that the center of gravity of a CD case is always supported by the positioning rails 35. If a positioning rail was not positioned on the extremity of the outer end portion of the base wall, the center of gravity of a CD might not be properly supported and the CD case would fall out. Positioning rails 35 serve the same function and have the same characteristics as the rails 26 located within receptacle 10. The purpose of projections 37 is to reduce the frictional contact of a thin CD case with the base wall portion and therefore help the thin CD case to slide more easily towards its complete insertion position.

Shown in FIGS. 7 and 8 is a CD receptacle 40 according to a fourth specific embodiment of the invention. Similarly to CD receptacle 10 as described above, CD receptacle 40 includes a back wall 42, a side wall portion 48, a base wall portion 52, a top wall 54 and two front walls 44 and 46. However, receptacle 40 includes two sets of positioning rails, 36 and 38, that enable receptacle 40 to receive compact disc cases having 3 different widths, or a plurality of thin CD cases simultaneously. As can be seen in FIG. 8, a thin CD, such as CD 101 shown in FIG. 5A would be able to fit snugly between positioning rails 36 and back wall 42. A medium width CD 102 is able to fit snugly between positioning rails 38 and back wall 42, and finally, a reasonably thick CD, such as a DVD, is able to fit snugly within receptacle 40 between the two front walls 44 and 46 and back wall 42.

Although FIGS. 1 through 8 show receptacles 10, 30, 39 and 40 all having positioning rails, it should be expressly understood that receptacles having no positioning rails, or receptacles having positioning rails only on the side wall portion, or only on the base wall portion, are also included within the scope of the invention. It should also be understood that a receptacle having more than two positioning rails (or two rows of positioning rails) is also within the scope of the invention. In a preferred embodiment the positioning rail (or row of positioning rails) that has the highest dimension is positioned adjacent to the front wall. In an embodiment such as that shown in FIGS. 7 and 8, wherein there is more than one row of positioning rails, the height of each row of positioning rails decreases as its proximity to the base wall increases. It should be understood that positioning rails of any shape and size are also included within the scope of the invention. For example, it can be seen in FIGS. 1 and 2 that receptacle 10 includes rectangular shaped positioning rails 26, while the positioning rails 38 and 36 of receptacle 40 are rounded.

In use, the individual receptacles 10, 30, 39, and 40 in accordance with the embodiments described above, are able to be used individually or in combination with other individual receptacles. The receptacles in accordance with the embodiments 10, 30, 39 and 40 as described above can be used in a modular manner in order to form panels of two or more receptacles. For the purpose of this specification, a panel refers to two or more receptacles connected together.

Figure 9:
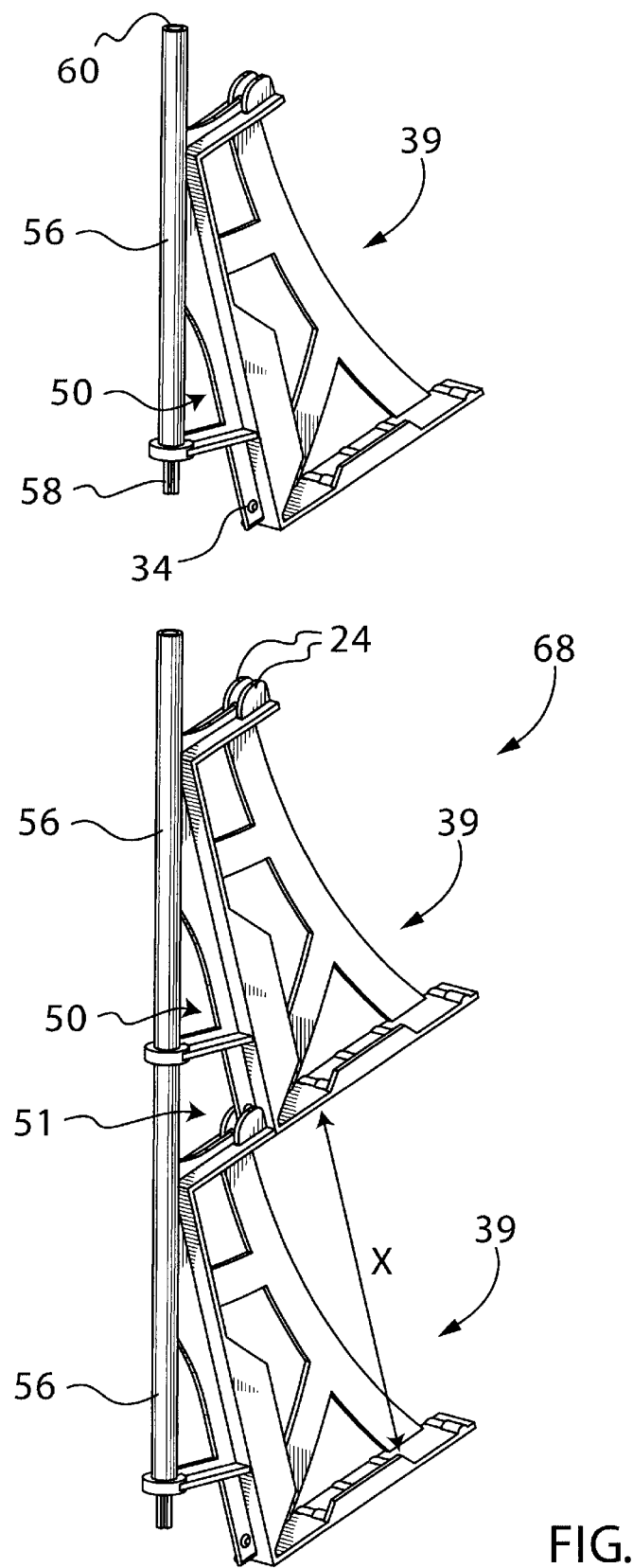
FIG. 9 is a front perspective view of two receptacles as shown in FIG. 6 connected together in accordance with a first specific embodiment of a panel, and a third receptacle as shown in FIG. 6 positioned thereabove.

Shown in FIG. 9 is a panel 68 in accordance with a first specific embodiment of a panel. Panel 68 is formed of two individual receptacles 39 that are connected together. A third unconnected receptacle 39 is positioned above the two connected receptacles.

It should be noted that each receptacle 10, 30, 39 and 40 as described above is connected to a rod-like portion 56. The rod-like portion 56 of each receptacle is used to either mount the individual receptacles within a display rack (as will be discussed later) or enables each receptacle to be connected to another receptacle to form a panel. As can be seen in FIGS. 1–4, and 6–7 it is the side wall portion of each receptacle that is positioned adjacent to the rod-like portion 56. Furthermore, the side wall portion can be positioned adjacent the rod-like portion at any angle of less than 90 degrees. Each rod-like portion includes an upper end pivot 60 and a lower end pivot 58 that define a pivot axis therebetween. In the specific example shown in FIG. 9, the pivot axis is coaxial with the longitudinal axis of rod-like portion 56. It should be understood, however, that receptacles that do not have a rod-like portion, and that simply comprise an upper end pivot and a lower end pivot that define an axis of rotation therebetween, are included within the scope of the invention. In such cases the side wall portion of the receptacle is positioned adjacent to the axis of rotation defined between the upper end pivot and the lower end pivot. Referring back to FIG. 9, in a preferred embodiment there is a space 50 defined between rod-like portion 56 and the side wall portion of a receptacle. In the cases where there is no rod-like portion, there exists a space between either one of the lower end pivot or the upper end pivot and the side wall portion. Therefore, in a preferred embodiment when two receptacles are connected together, a space 51 is formed between lower end pivot 58 and the side wall portion 14 of the receptacle on the top. As will be explained in detail further on in the specification, space 51 permits the insertion of a panel retaining board, used to stabilize a panel, between two receptacles without causing a gap between the two connected receptacles.

As will be explained with reference to FIG. 9, it can be seen that upper end pivot 60 and lower end pivot 58 also act as matching connectors for connecting two receptacles together. The upper end pivot 60 and the lower end pivot 58 include a projection at one of the upper end pivot and lower end pivot, and a receiving cavity at the other one of the upper end pivot and lower end pivot. In the specific example shown in FIG. 9, the lower end pivot is projection 58 and the receiving cavity is located within the upper end pivot 60. The inner diameter of the receiving cavity is greater than the transverse measurement of the projection, thereby enabling the projection to be inserted within the cavity of another receptacle in order to connect two receptacles together. In addition, in embodiments 10, 39 and 40 as described above, included on the outer-lower surface of the side wall portions is a lower end connector 34 that fits within an upper end connector 24 located on the upper surfaces of the top walls of other receptacles. Therefore, as can be seen in FIG. 9, in order to connect the two individual receptacles 39 together, the projection that is the lower end pivot 58 of a given receptacle 39 is inserted within the cavity of the upper end pivot 60 of a second given receptacle 39, and the lower end connector 34 of a given receptacle is inserted into the upper end connector 24 of the second given receptacle.

Figure 10:
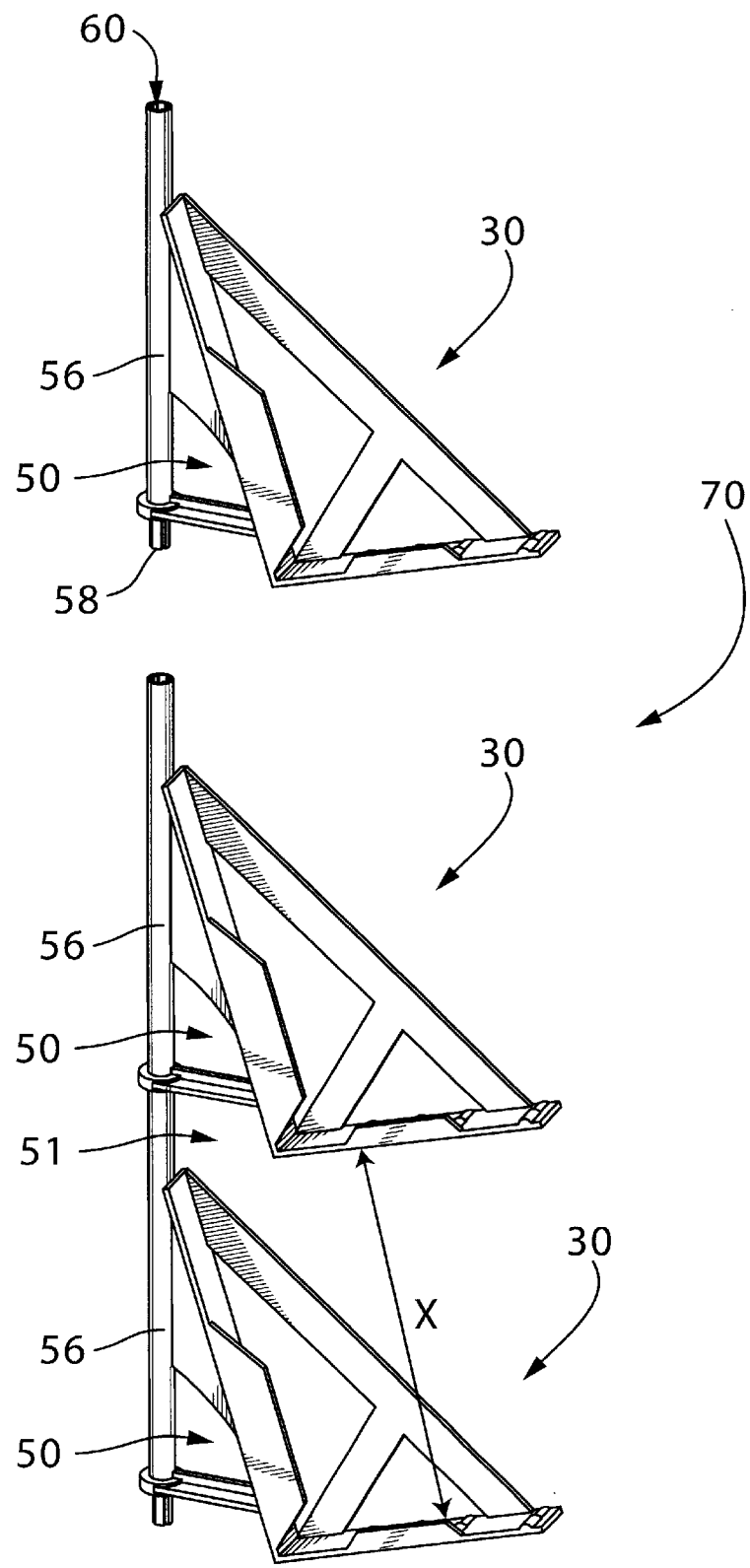
FIG. 10 is a front perspective view of two receptacles as shown in FIG. 3 connected together in accordance with a first specific embodiment of a panel, and a third receptacle as shown in FIG. 3 positioned thereabove.

Shown in FIG. 10 is a panel 70 in accordance with a second specific embodiment of a panel. Panel 70 is formed of two individual receptacles 30 that are connected together. A third unconnected receptacle 30 is positioned above the two connected receptacles. Receptacles 30 are connected together in the same way as described above with respect to FIG. 70, except that there is no connection between the top wall of one receptacle and the side wall portion of a second receptacle. In the embodiment of receptacle 30, due to the absence of a top wall, and consequently the absence of the previously described lower end and upper end connectors, it is desirable that the connection of an upper end pivot 60 with a lower end pivot 58 prevents each connected receptacle from rotating independently. Consequently, in a specific embodiment, the inner cavity at the upper end pivot 60 is not cylindrical but is instead cross shaped in order to correspond to a cross-shaped projection at the lower end pivot 58.

Although only receptacles 30 and 39 are shown connected together to form panels, it should be expressly understood that receptacles 10 and 40 in accordance with the other specific embodiments described above can also be connected together to form panels. It should also be understood that individual receptacles can be connected together using any other technique known in the art without departing from the spirit of the invention. For example, instead of having integrated pivots as previously described, it is within the scope of the invention that each receptacle includes a hole for receiving an external rod that is vertically inserted through the holes in order to form a rotation axis. The external rods (not shown) can be very long to cross many receptacles and act as the upper end pivot and lower end pivot of a whole panel. Alternatively, the external rod is short and connects only two receptacles together.

In addition to panels formed of individual receptacles connected together, panels can be formed of a single piece comprising multiple integrally formed receptacles. FIGS. 11–15 show various specific embodiments of integrally formed panels.

Figure 11:
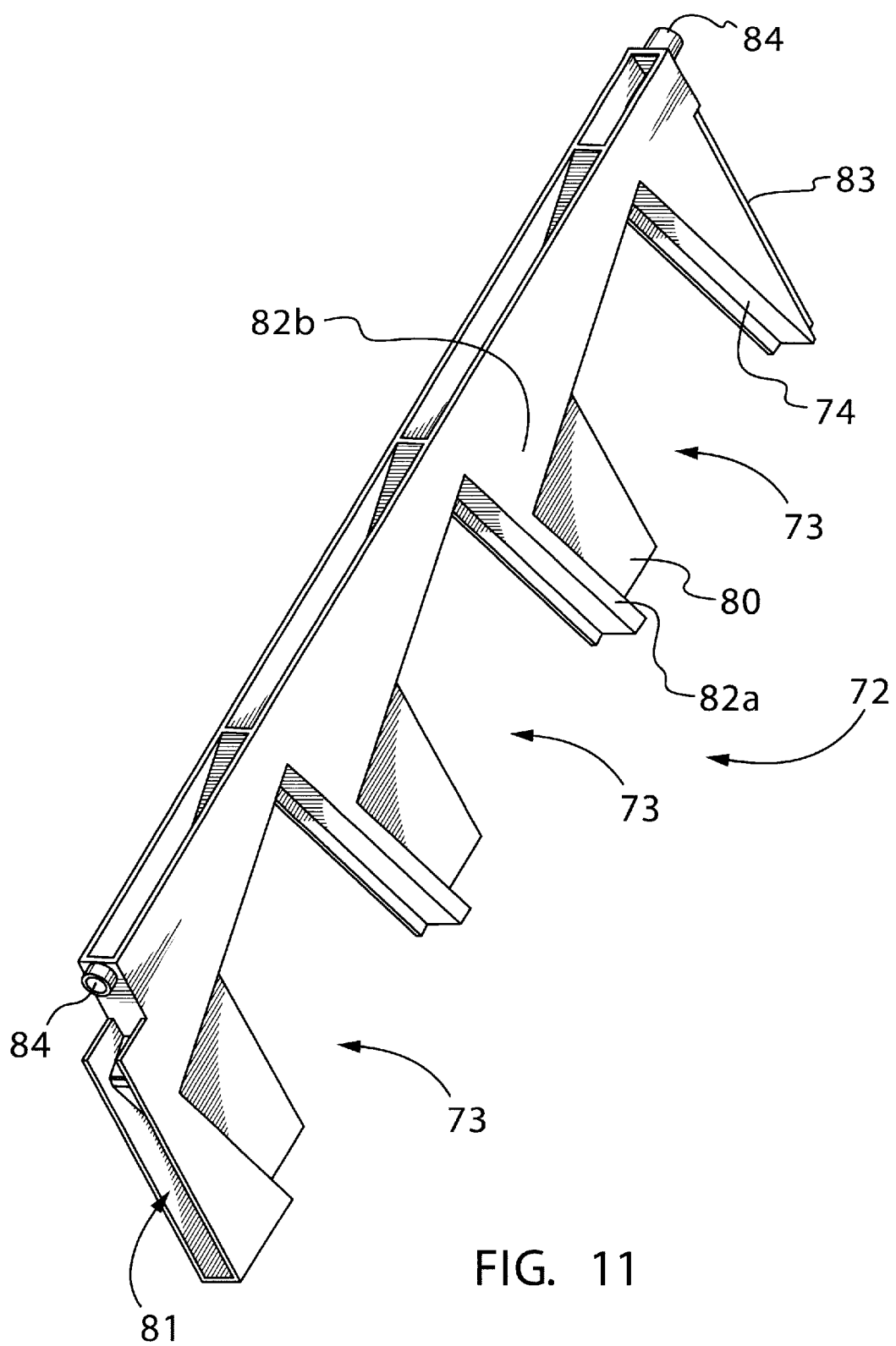
FIG. 11 is front perspective view of an integral panel in accordance with a third specific embodiment of a panel.
Figures 12, 13:
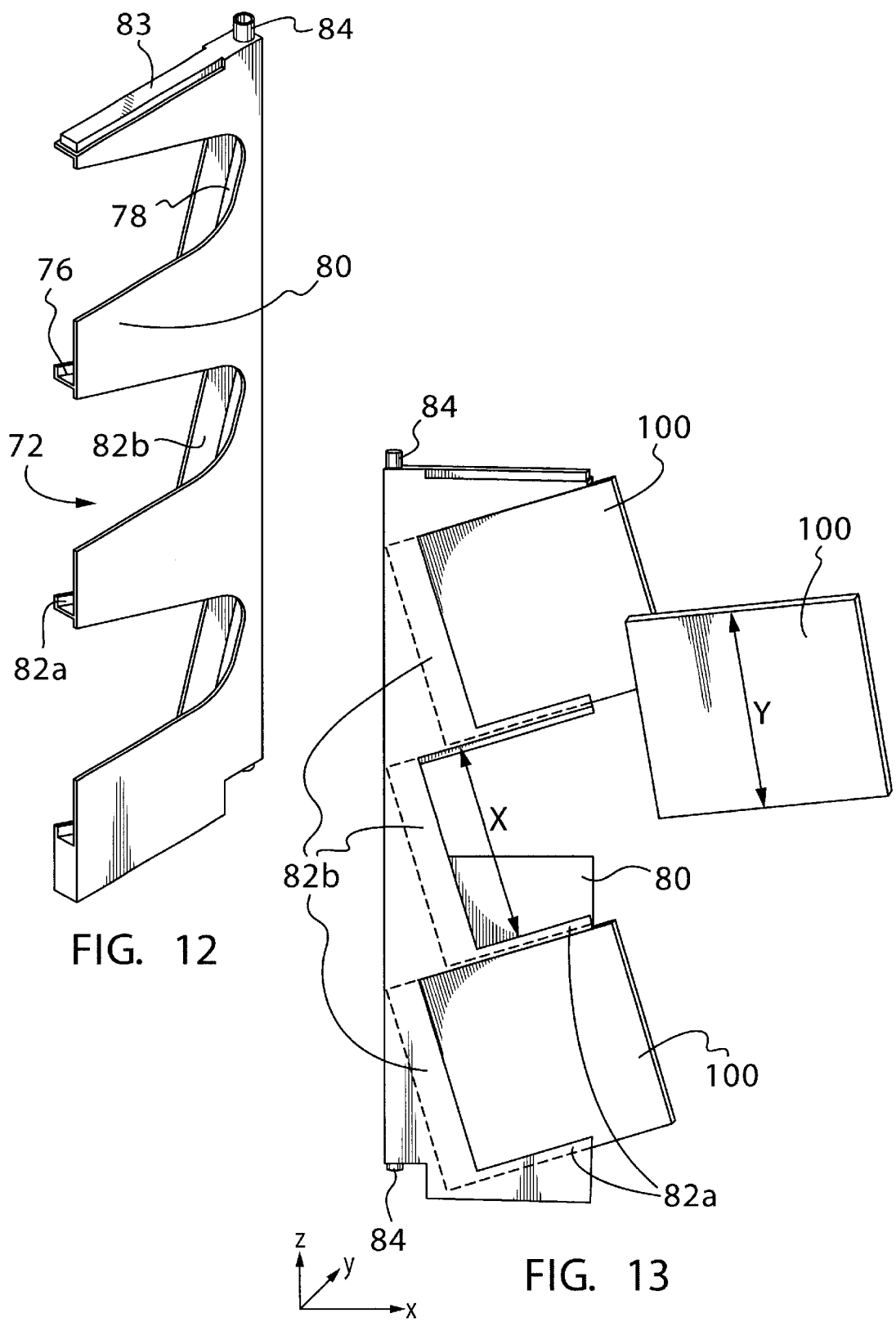
FIG. 12 is a rear perspective view of the panel of FIG. 11.
FIG. 13 is a side elevation of the panel of FIG. 11 with compact disc cases inserted therein.

Shown in FIGS. 11 and 12 is an integral panel 72 in accordance with a third specific embodiment of a panel. As can be seen, integral panel 72 includes three receptacles 73 that each have a top wall 74, a base wall portion 76, a side wall portion 78, a back wall 80 and a front wall formed in a generally L-shaped configuration having a lower portion 82a and an upper portion 82b. The lower portion 82a extends along base wall portion 76 and the upper portion 82b extends along side wall portion 78. The receptacles 73 have the same functionality as receptacle 10 as described above. Therefore, although the front wall is divided into two portions 82a and 82b, the front wall and back wall 80 are characterized by a geometric relationship such that a compact disc case may be inserted within receptacles 73 through a multiple direction entry path by performing the same first movement and second movement as described in relation to receptacle 10.

FIG. 13, shows panel 72 in use. In order to allow a compact disc case to be inserted within receptacle 73 through the first and second movements as described above, each receptacle 73 defines a space "x" between top wall 74 and the upper edge of front wall 82a, wherein space "x" is slightly larger than the height "Y" of a CD case. Space "x" is slightly larger than height "Y" of a CD case such that a CD case is able to be moved through the first movement in a direction generally perpendicular to the imaginary plane of the compact disc case such that the compact disc case can be moved past front wall 82a and 82b and brought into abutment with back wall 80. The distance "x" as described above is also shown in FIGS. 9 and 10 and it should be understood that this relationship exists with all the panels described above. For receptacle 30 which has no top wall the same rule applies only distance "x" is defined from the upper edge of its lower front wall and the bottom side of the base wall of a receptacle positioned directly above the receptacle.

In an alternative embodiment, "x" could be slightly smaller than "Y", as long as the distance between the base wall and the top wall is slightly larger than "Y" and the lower front wall is short enough, so that it is possible, as a first step to the first movement, to have only the bottom peripheral side of the CD case touch the back wall, as a second step of same first movement, to push the upper side of the CD case toward the back wall to put it in its upright position, without being blocked by the top wall 74. This implies that front wall 82a must be short enough to allow the CD case to abut with the base wall, or be sufficiently close to it, even before the CD case is brought to its upright position.

Shown in FIG. 14 is an integral panel 86 in accordance with a fourth specific embodiment of a panel. Similarly to integral panel 72, integral panel 86 includes three receptacles 88 that each have a top wall (not shown), a bottom wall (not shown), an inner side wall portion (not shown), a back wall 92 and a front wall 94, which is also substantially L-shaped. As can be seen, the receptacles 88 of integral panel 86 are not positioned on an upward angle in relation to the horizontal. Therefore, in order to ensure that inserted CD cases do not fall out of receptacles 88, each receptacle 88 includes a projection 90 positioned on the outer end portion of the base wall portion. The base wall portion includes an inner end portion which is attached to the side wall portion, an intermediate portion which is for receiving a compact disc case, and an outer end portion that includes projection 90. Therefore, when a CD is inserted within receptacle 88, it sits on the intermediate portion of the base wall portion such that it fits between the side wall portion (not shown) and the projection 90 such that the projection 90 prevents the inserted CD case from sliding out of its receptacle 88. In an alternative embodiment, receptacles 88 are positioned at a slight upward inclination with respect to a horizontal axis.

Shown in FIG. 15 is an integral panel 96 in accordance with a fifth specific embodiment of a panel. As can be seen, integral panel 96 includes three receptacles 97 that each include a top wall (not shown), a bottom wall 98, an inner side wall portion (not shown), a back wall 99 and a front wall 103. In order to maintain inserted CD cases within the receptacles of panel 96 such that they do not fall out, each receptacle 97 includes a projection 104 positioned on either the front wall 103 or the back wall 99, such that the projection extends into the space defined between front wall 103 and back wall 99. For example, in the upper most receptacle 97 of integral panel 96, the projection 104 is positioned on front wall 103 and extends into the space between front wall 103 and back wall 99, whereas, in the middle and bottom receptacles 97, projections 104 are positioned on the surface of back wall 99. In operation, when a CD is inserted within a receptacle 97, the CD is frictionally engaged between projection 104 and either the back wall 99 or front wall 103 depending on which surface the projection is located. The frictional engagement of the CD between the projection 104 and one of the walls of the receptacle maintains the CD in place until it is forcibly removed. In an alternative embodiment, receptacles 97 are positioned at a slight upward inclination with respect to a horizontal axis.

Although integral panels 72, 86 and 96 are shown to include 3 receptacles, it is within the scope of the invention for each panel to include any number of receptacles. In a preferred non-limiting example of implementation, the receptacles are positioned on top of one another and are aligned such that their back walls are generally coplanar.

Figure 16:
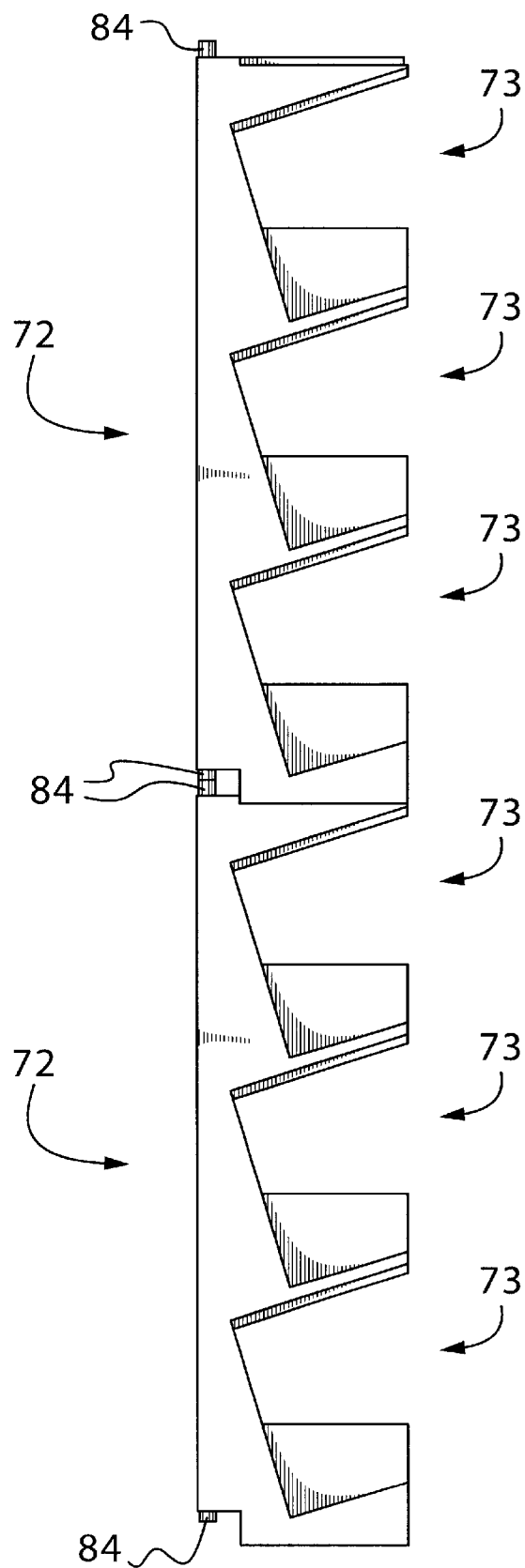
FIG. 16 is a side elevation of two panels as shown in FIG. 11 connected together.

Additionally, it is within the scope of the invention for two or more panels to be connected together. FIG. 16 shows two integral panels 72 in accordance with the first specific embodiment shown in FIGS. 11, 12 and 13 connected together in order to form a panel having six receptacles 73. As a non-limiting example of implementation, panels 72 are connected together by mating male and female parts. Referring back to FIGS. 11 and 12, it can be seen that at the base of panel 72 is a cavity 81. In addition, at the top of panel 72 is a corresponding protrusion 83, that acts as a male connector, that can fit within cavity 81 that acts a female connector. Therefore, in order to connect two panels 72 together, protrusion 83 of a first panel is inserted within cavity 81 of a second panel such that the two panels are frictionally engaged together. Panels 86 and 96 in accordance with the second and third specific embodiments can also be connected together in the same manner (details not shown in figures).

As can be seen in FIGS. 11–15, each of integral panels 72, 86 and 96, as described above, includes an upper end pivot and a lower end pivot (both indicated by reference 84) located on the upper portions and lower portions of the panels respectively. As will be described in more detail further on in the specification, upper end and lower end pivots 84 are operative to pivotably connect panels 72, 86 and 96 to various display and storage racks.

Figure 17:
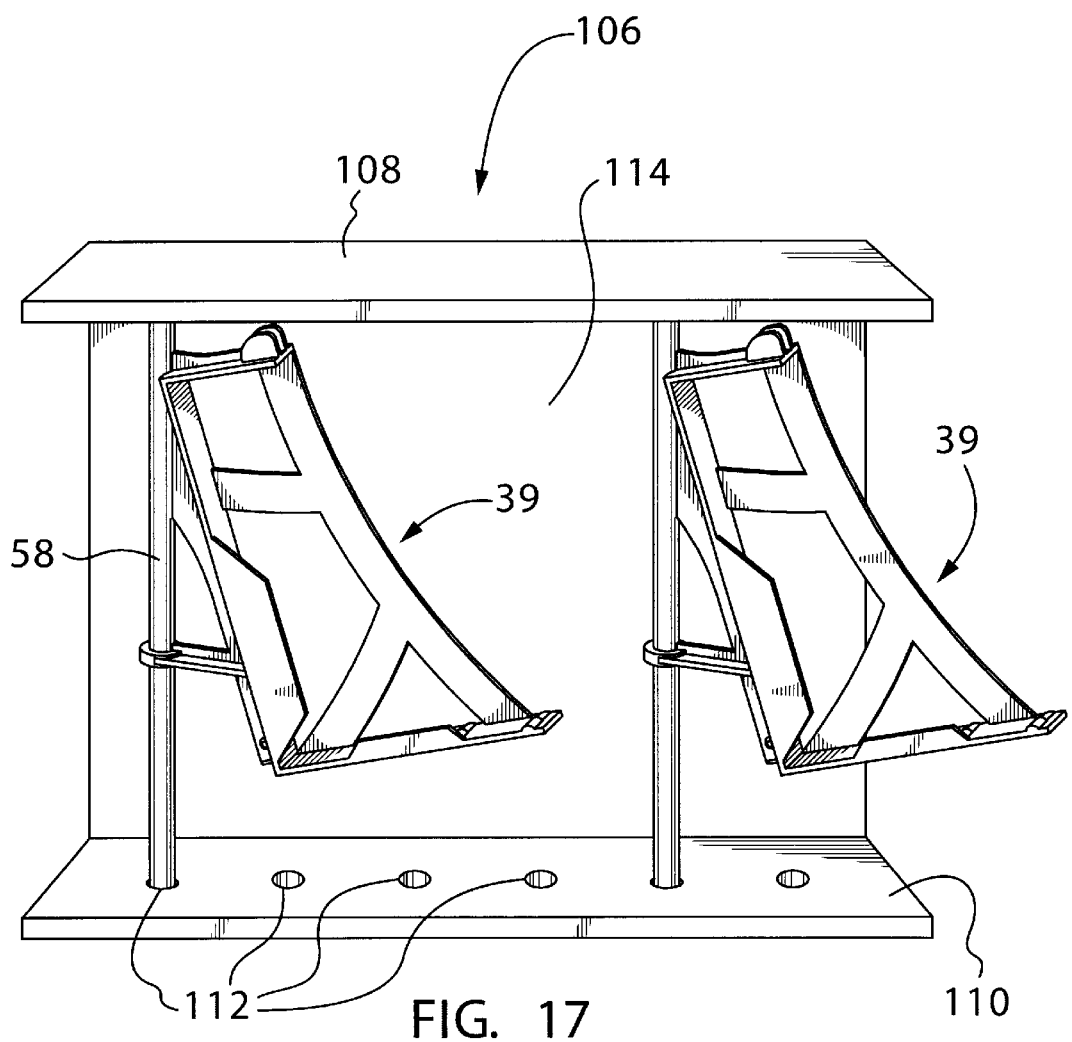
FIG. 17 is a front perspective view of a display rack in accordance with a first specific example of a display rack, having a receptacle as shown in FIG. 1 contained therein.

Both individual receptacles 10, 30, 39 and 40, and panels 68, 70, 72, 86 and 96 can be inserted within display racks that can accommodate a plurality of individual receptacles or panels. FIG. 17 shows two receptacles 39 held within a display rack 106 according to a first specific embodiment of a display rack. Display rack 106 comprises a top board 108, a bottom board 110 and a backboard 114. Bottom board 110 includes a series of holes 112, and although not shown in FIG. 17, top board 108 includes a corresponding series of holes. Therefore, an individual receptacle 10 may be inserted into display case 106 by connecting the lower end pivot 58 to an additional rod portion, such that the rod portion is adapted to be inserted within a hole 112 in bottom board 110 and by inserting the upper end pivot 60 within a corresponding hole in the top board 108. Preferably, holes 112 are of a diameter that is slightly larger than the diameter of pivots 58 and 60 such that receptacle 39 is pivotable about the vertical axis formed between upper end pivot 60 and lower end pivot 58 when it is mounted within display rack 106.

In an alternative embodiment, top board 108 and bottom board 110 can be used without backboard 114 and can be mounted individually to an item of furniture in a spaced apart relationship such that the top board 108 is positioned directly above the bottom board 110. For example, this can be done within a shelf of a bookcase, or within a cupboard of a wall unit. In this alternative embodiment, top board 108 and bottom board 110 can be spaced apart so as to receive a plurality of individual receptacles 10, 30, 39 or 40, or a plurality of panels 68, 70, 72, 86, 96 as described above. The two boards may be mounted to a piece of furniture using any technique known in the art, such as adhesive, screws, rivets, etc . . . .

Figure 18:
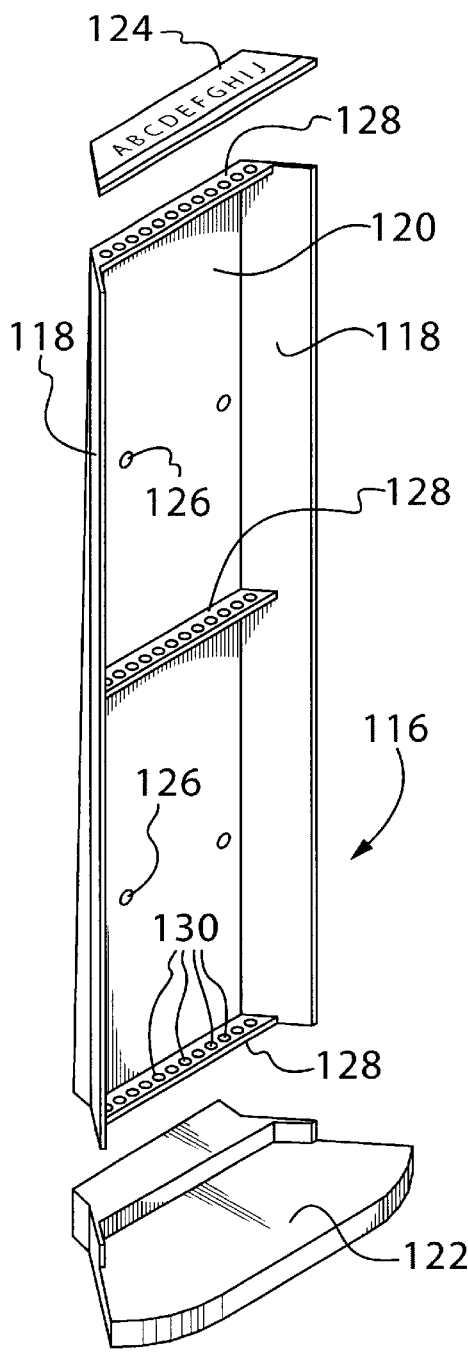
FIG. 18 is a front perspective view of a display rack in accordance with a second specific example of a display rack.
Figure 19:
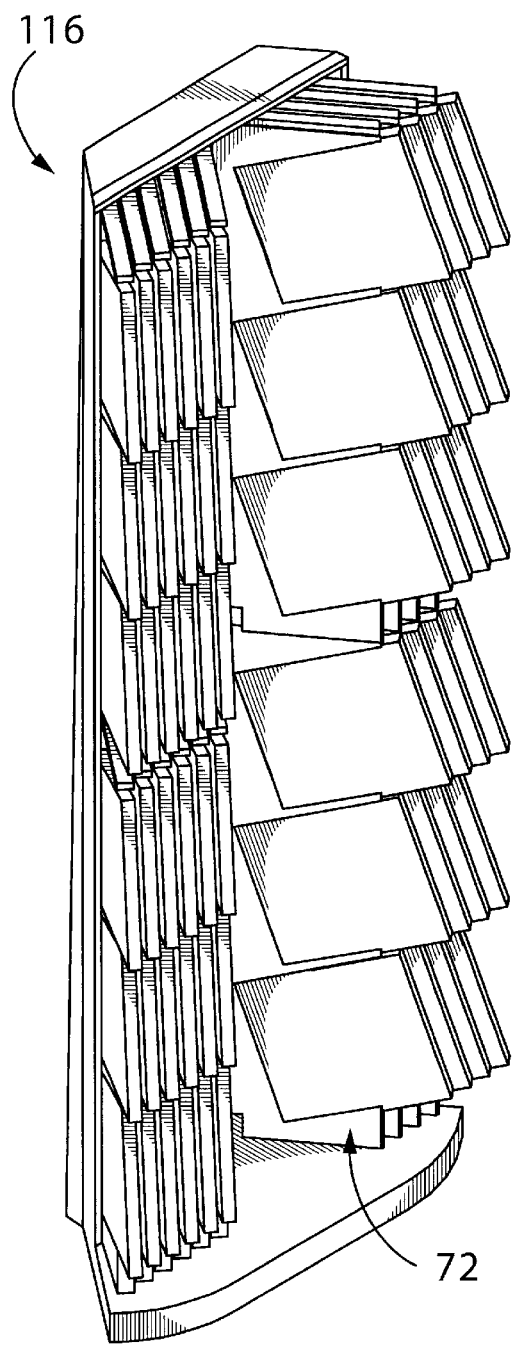
FIG. 19 is a front perspective view of the display rack of FIG. 18 with a plurality of panels as shown in FIG. 16 contained therein.

Shown in FIGS. 18 and 19 is a display rack 116 in accordance with a second specific embodiment of a display rack. Display rack 116 includes two sideboards 118, a backboard 120, a base support 122 and a top board 124. Top board 124 is adapted to fit on top of backboard 120 and sideboards 118. In a preferred embodiment, top board 124 includes labels, or letters in order to allow a user to organize the CDs contained within display rack 116 into alphabetical order, or into various categories.

Side boards 118 and backboard 120 are adapted to attach to the base support 122 such that display rack 116 is able to sit on the floor. Side boards 118 and backboard 120 can be attached to base support 122 using any technique known in the art without departing from the spirit of the invention. Alternatively, side boards 118 and backboard 120 are able to be mounted to a wall using bracket holes 126 located on the surface of backboard 120. Also positioned on the inside surface of backboard 120 are panel retaining boards 128 that each include holes 130. Panel retaining board 128 in the middle of the rack 116 is optional since the vertical modularity of individual receptacles or panels, as shown in FIGS. 9 and 16 for example, does not require panel retaining board 128 at every interconnection point between connected individual receptacles or between connected panels. The panel retaining board 128 in the middle is only added to provide extra rigidity to the assembly. It is panel retaining boards 128 located at the upper and lower end of rack 116 that are adapted to maintain panels in accordance with any of the embodiments described above, within display rack 116. More specifically, the holes 130 in the panel retaining boards 128 are operative to receive the upper end and lower end pivots 84 located on either end of integral panels 72, 86, 96, or alternatively are adapted to receive the upper end pivot 60 and lower end pivot 58 of any individual receptacle described above.

FIG. 19 shows a plurality of panels 72 positioned within display rack 116. It should be noted that two panels 72 positioned on top of each other are held within rack 116. Similarly to the holes of display rack 106, the holes 130 of display rack 116 have a greater diameter than the diameter of protrusions 84 of each panel, thereby enabling the panels to pivot along a vertical axis within display rack 116. As can be seen in FIG. 19, panels 72 are placed within rack 116 like pages in a book and can be pivoted panel by panel in order to locate a desired CD.

Figure 20:
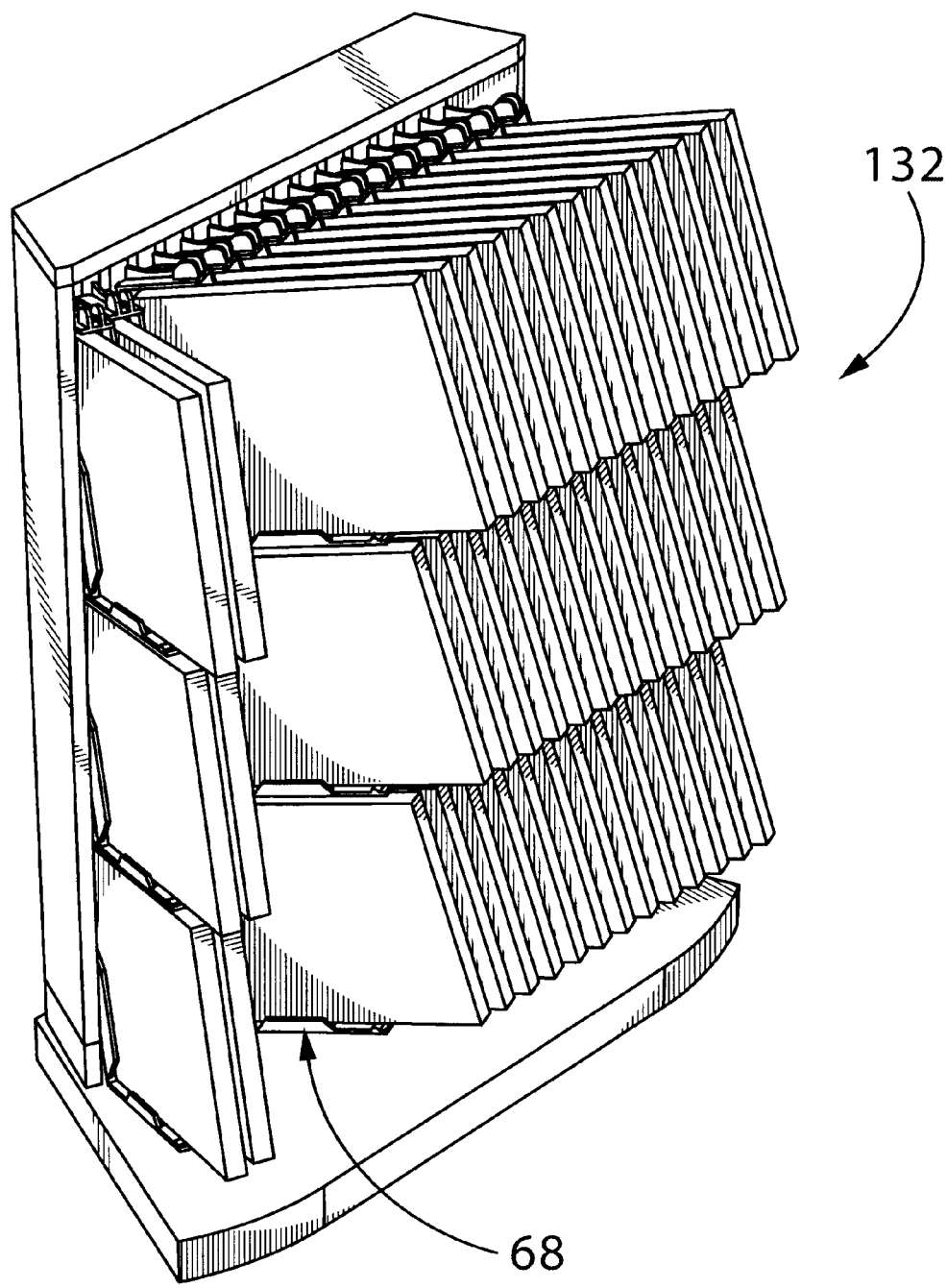
FIG. 20 is a front perspective view of a display rack in accordance with a third specific example of a display rack, with a plurality of panels as shown in FIG. 9 contained therein.

FIG. 20, shows a display rack 132 in accordance with a third specific embodiment of a display rack. Display rack 132 is similar to display rack 116, however it includes only two retaining strips (not shown) and therefore can only accommodate one panel in the vertical direction. In the embodiment shown in FIG. 20, a plurality of panels 68 are attached within display rack 132, however, panels in accordance with any of the embodiments described above can be used within display rack 132.

Figure 21:
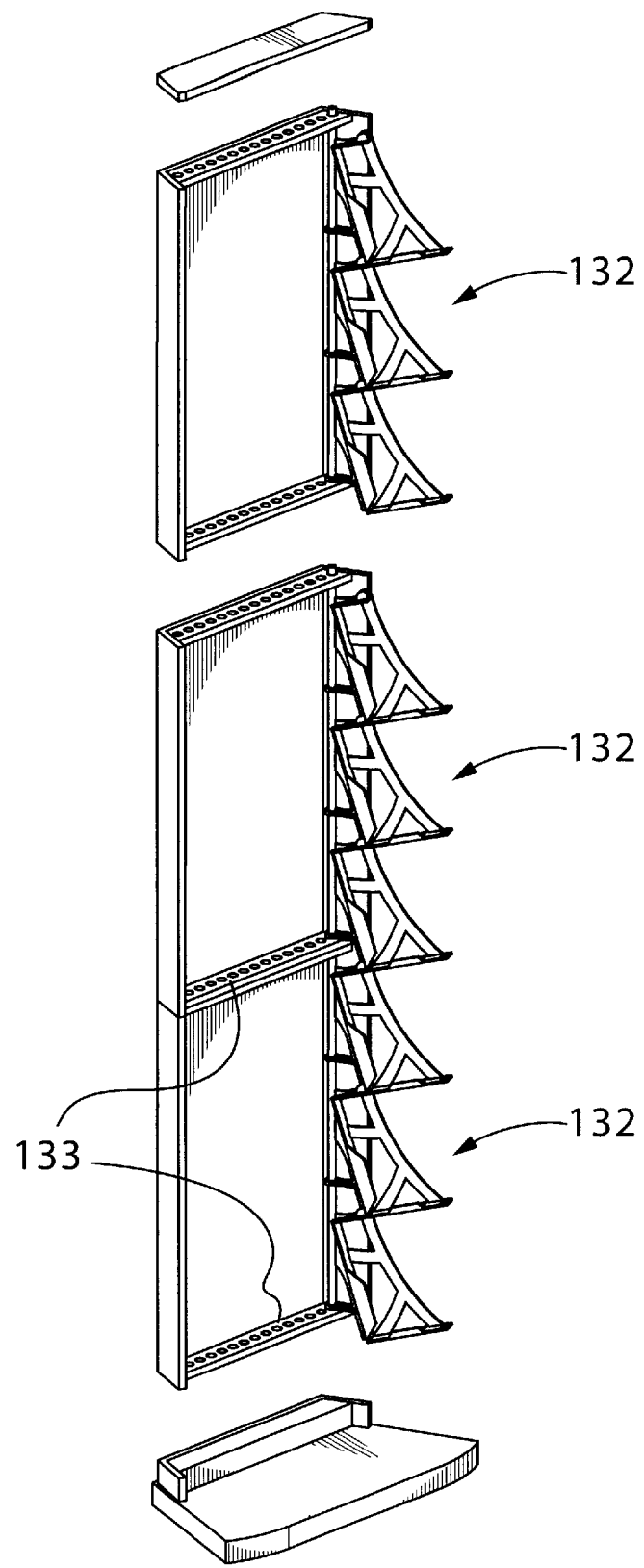
FIG. 21 is a front perspective view of three display racks as shown in FIG. 20 stacked above one another.

Display rack 132 has the advantage that it may be used in a modular manner. For example, multiple display racks 132 can be connected together either in a vertical manner, or in a horizontal manner, in order to accommodate more panels. FIG. 21 shows an example of three display racks 132 connected together in a vertical manner. Although not shown in FIG. 21, in a preferred embodiment display racks 132 are connected together by mating male and female parts. However, this is only one form of realization as many other ways to connect display racks 132 may be used without departing from the spirit of the invention.

As can be seen in FIG. 21, each display rack 132 includes two panel retaining boards 133 that are adapted to retain panels within the display rack. It must be understood however that, in general, any similar modular rack could also have one or many additional panel retaining boards 133 (not shown) in the middle of rack 132 to provide more rigidity to the vertical panel assembly. When two display racks are connected one on top of the other, the upper panel retaining board 133 of the lower display rack 132 and the lower panel retaining board 133 of the upper display rack 132 engage each other in an overlapping relationship. This can be seen in the expanded view shown in FIG. 22.

Figure 22:
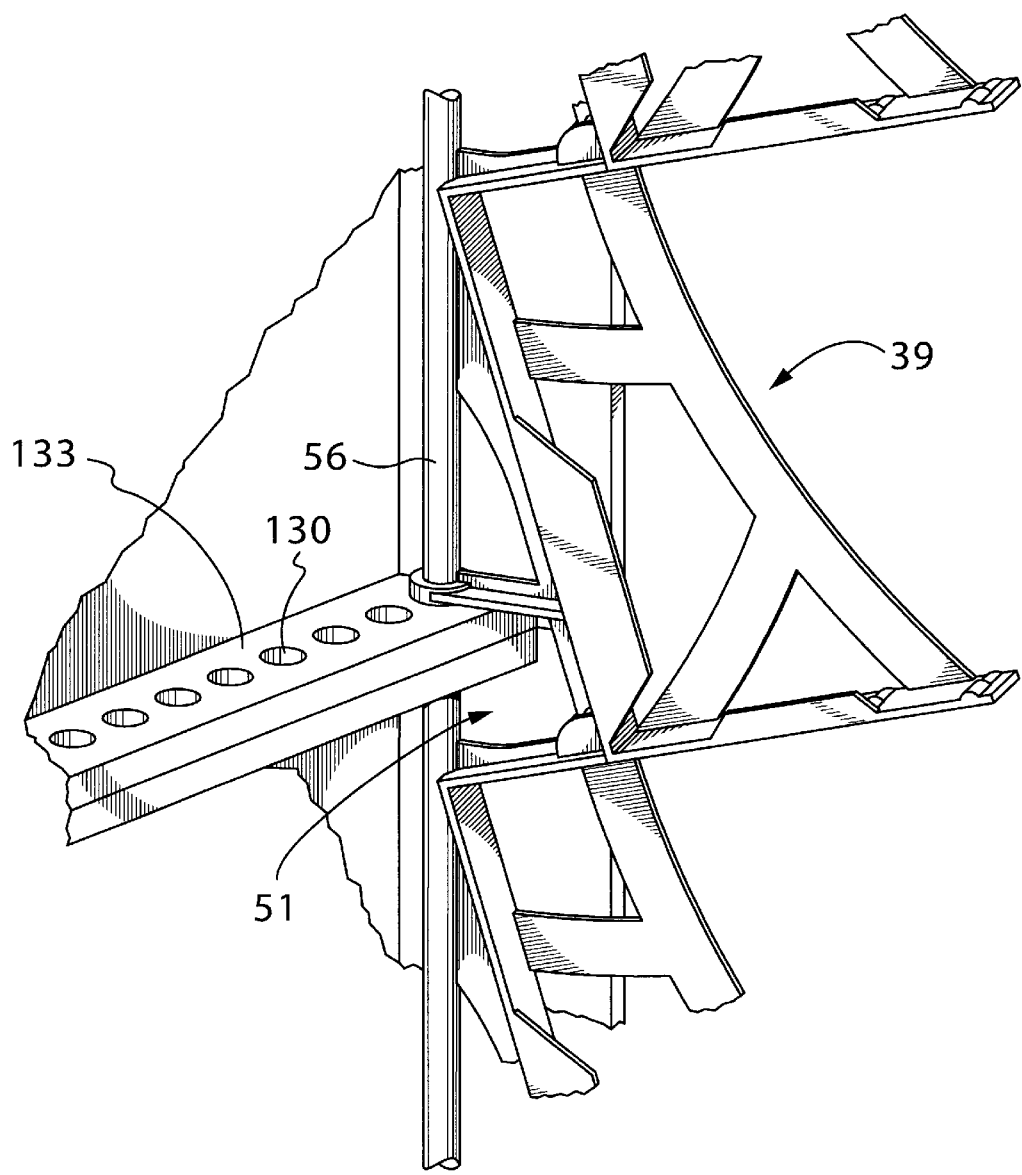
FIG. 22 is an expanded view of a portion of FIG. 21.

An advantage of panels 68 and 70 as described in relation to FIGS. 9 and 10, and of panel 72 in relation to FIG. 16, is that there is a space 51 defined between lower end pivot 58, in the case of panels 68 and 70, or lower end pivot 84, in the case of panel 72, and the side wall portions of the connected receptacles, or panels. Therefore, as can be seen in FIGS. 21 and 22, even when rack 132 is connected in a modular manner such that two panel retaining boards 133 engage each other, the retaining boards are able to fit within space 51 such that two receptacles are able to sit directly on top of one another.

Figure 23:
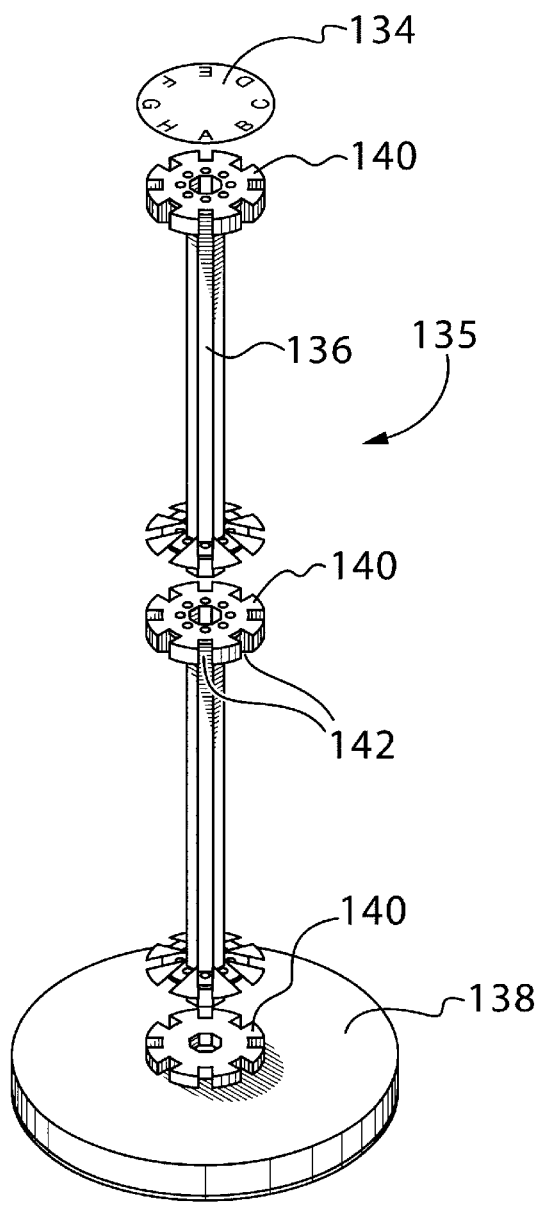
FIG. 23 is a front perspective view of a display rack in accordance with a fourth specific example of a display rack.

Shown in FIG. 23 is a carousel-type display rack 135 in accordance with a fourth specific embodiment of a display rack. As can be seen, display rack 135 includes a top portion 134, a central bar 136, a base portion 138 and retaining portions 140 that include a plurality of slots 142.

Figure 24:
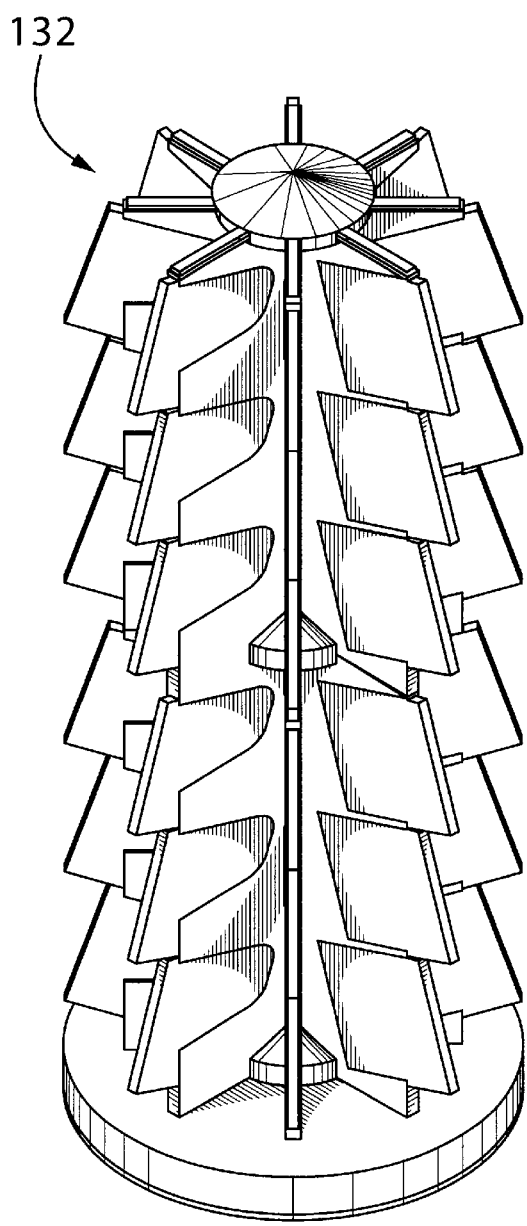
FIG. 24 is a front perspective view of the display rack in FIG. 23 with a plurality of panels as shown in FIG. 11 contained therein.

FIG. 24 shows panels 72 in accordance with the embodiment shown in FIGS. 11–13 positioned within the slots 142 of retaining portions 140. Since the back edges of panels 72 are engaged within slots 142, the panels 72 are unable to pivot about their vertical axes. Instead, base element 138 is rotatable about its center so as to allow a user to access all the different panels contained within rack 135.

Figure 25A:
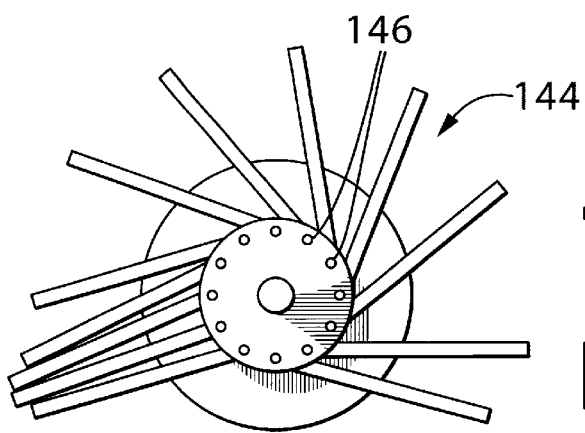
FIG. 25A is a top plan view of a display rack in accordance with a fifth specific example of a display rack, with a plurality of panels contained therein.
Figure 25B:
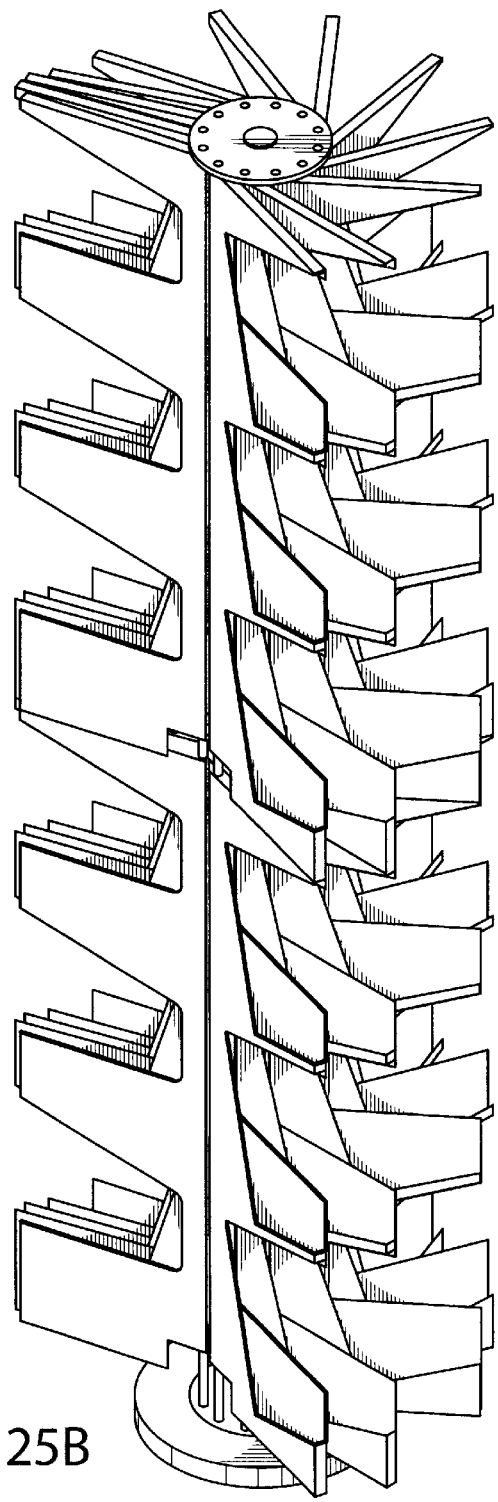
FIG. 25B is a perspective view of the display rack and panels as shown in FIG. 25A.

Shown in FIGS. 25A and 25B is a carousel-type display rack 144 in accordance with a fifth specific embodiment of a display rack, wherein the panels 72 are connected to rack 144 by their protrusions 84. Protrusions 84 are positioned within holes 146 such that panels 72 are pivotable about their vertical axis.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A receptacle for a compact disc case lying in an imaginary plane, the compact disc case having a pair of main opposed faces generally parallel to the imaginary plane and a peripheral sidewall extending between the main faces, the peripheral sidewall having a thickness, said receptacle comprising:

a back wall;

a front wall spaced from said back wall by a distance not less than the thickness of the peripheral sidewall of the compact disc case;

said front wall and said back wall defining therebetween a space for receiving the compact disc case;

said front wall and said back wall defining a multiple direction entry path for the insertion of the compact disc case in said space, the compact disc case being movable through said entry path by performing a first movement and a second movement;

the first movement being a movement during which the compact disc case is displaced toward said back wall along a direction generally perpendicular to the imaginary plane, said front wall and said back wall being characterized by a geometrical relationship such that during the first movement the compact disc case can be moved past said front wall and brought in abutment against said back wall;

the second movement being a movement during which the compact disc case is displaced between said front wall and said back wall along a direction generally parallel to the imaginary plane such as to bring the compact disc case in a position where said front wall overlaps with a portion of one of the main faces of the compact disc case and the back wall overlaps with at least a portion of the other main face of the compact disc case.

2. A receptacle as defined in claim 1 further comprising a peripheral wall extending between said front wall and said back wall, said peripheral wall having a base wall portion and a side wall portion.

3. A receptacle as defined in claim 2, wherein said base wall portion and said side wall portion are at a substantially right angle with respect to each other.

4. A receptacle as defined in claim 2, wherein said front wall comprises a first section and a second section, said first section extending along said base wall portion, and said second section extending along said side wall portion.

5. A receptacle as defined in claim 4, wherein said base wall portion includes:

an inner surface;

an outer surface;

a longitudinal axis;

a width, and;

at least one projection extending from said inner surface, said projection having a width less than that of said base wall portion, and extending along said longitudinal axis.

6. A receptacle as defined in claim 4, wherein said base wall portion includes an outer end portion, and at least a portion of said projection extends to the extremity of said outer end portion.

7. A receptacle as defined in claim 4, wherein said side wall portion includes:

an inner face;

an outer face;

a longitudinal axis;

a width, and;

at least one projection extending from said inner face, said projection having a width less than that of said side wall portion, and extending along said longitudinal axis.

8. A receptacle as defined in claim 4, wherein said receptacle includes a rod-like portion adjacent said side wall portion.

9. A receptacle as defined in claim 4, wherein said receptacle includes an upper end pivot and a lower end pivot defining a pivot axis therebetween.

10. A receptacle as defined in claim 9, where said base wall portion is positioned at an upward incline with respect to said pivot axis.

11. A receptacle as defined in claim 9, wherein a space is defined between one of said lower end pivot and said upper end pivot, and said side wall portion.

12. A receptacle as defined in claim 9, wherein one of said upper end pivot and said lower end pivot includes a cavity with an inner diameter, and the other of said upper end pivot and said lower end pivot includes a protrusion with a transverse measurement that is receivable within said cavity.

13. A receptacle as defined in claim 2, wherein said base wall portion includes:

an inner end portion adjacent said side wall portion;

an intermediate portion for receiving the compact disc case; and an outer end portion having a projection for preventing the compact disc case from sliding out of said intermediate portion.

14. A receptacle as defined in claim 2, wherein one of said front wall and said back wall includes a projection that extends into the space defined between said front wall and said back wall.

15. A receptacle as defined in claim 1, wherein said base wall portion extends outwardly from said side wall portion to a distance that surpasses the center of gravity of the CD case once the CD case has performed the first movement and prior to the CD case performing the second movement.

16. A receptacle, as defined in claim 1, further comprising a lower end connector adjacent to said side wall portion.

17. A receptacle as defined in claim 16, further comprising an upper end connector on said top wall, wherein said lower end connector on a first receptacle is adapted to mate with said upper end connector on a second receptacle when said first and second receptacles are connected together.

18. A panel comprising more than one receptacle as defined in claim 1.

19. A panel as defined in claim 18, wherein said receptacles are aligned such that said back walls of said receptacles are coplanar.

20. A receptacle for a compact disc case, the compact disc case having a pair of main opposed faces and a peripheral sidewall extending between the main faces, the peripheral sidewall having a thickness, said receptacle comprising:

a back wall;

a front wall spaced from said back wall by a distance not less than the thickness of the peripheral sidewall of the compact disc case;

said front wall and said back wall defining therebetween a space for receiving the compact disc case;

said front wall and said back wall defining a multiple direction entry path for the insertion of the compact disc case in said space, the compact disc case being movable through said entry path by performing a first movement and a second movement;

the first movement being a movement during which the compact disc case is displaced toward said back wall along a direction generally perpendicular to said back wall of said receptacle, said front wall and said back wall being characterized by a geometrical relationship such that during the first movement the compact disc case can be moved past said front wall and brought in abutment against said back wall;

the second movement being a movement during which the compact disc case is displaced between said front wall and said back wall along a direction generally parallel to said back wall of said receptacle such as to bring the compact disc case in a position where said front wall overlaps with a portion of one of the main faces of the compact disc case and the back wall overlaps with at least a portion of the other main face of the compact disc case.

* * * * *